US011085990B2

United States Patent
Park et al.

(10) Patent No.: US 11,085,990 B2
(45) Date of Patent: Aug. 10, 2021

(54) ANGLE OF ARRIVAL MEASUREMENTS USING RF CARRIER SYNCHRONIZATION AND PHASE ALIGNMENT METHODS

(71) Applicant: PhasorLab, Inc., Billerica, MA (US)

(72) Inventors: Joshua C. Park, Billerica, MA (US); Cuneyt Demirdag, Nashua, NH (US); Glen Wolverton, Holden, MA (US); Devang Topiwala, Nashua, NH (US); Paul McFarthing, Boston, MA (US)

(73) Assignee: PhasorLab, Inc., Billerica, MA (US)

( * ) Notice: Subject to any disclaimer, the term of this patent is extended or adjusted under 35 U.S.C. 154(b) by 0 days.

(21) Appl. No.: 15/929,279

(22) Filed: Apr. 21, 2020

(65) Prior Publication Data

US 2020/0386844 A1   Dec. 10, 2020

Related U.S. Application Data

(63) Continuation of application No. 15/495,972, filed on Apr. 24, 2017, now Pat. No. 10,627,473, which is a
(Continued)

(51) Int. Cl.
*G01S 3/48* (2006.01)
*H04L 7/00* (2006.01)
(Continued)

(52) U.S. Cl.
CPC .................. *G01S 3/48* (2013.01);
*G01S 3/18* (2013.01); *G01S 3/46* (2013.01); *H04B 7/0617* (2013.01);
(Continued)

(58) Field of Classification Search
CPC ...... G01S 3/48; H04L 7/0016; H04L 27/0014
(Continued)

(56) References Cited

U.S. PATENT DOCUMENTS 6,304,214 B1 * 10/2001 Aiken ................. H01Q 3/2605
342/362
6,661,852 B1 * 12/2003 Genrich ................ H03D 3/009
375/326

(Continued)

*Primary Examiner* — Qutbuddin Ghulamali
(74) *Attorney, Agent, or Firm* — Michael Y. Saji

(57) ABSTRACT

A method for determining an angle of arrival (AOA) of a received signal is disclosed, comprising: generating a baseband information signal by mixing a received signal with a local oscillator (LO) signal, the received signal being an in-phase signal and quadrature signal uncorrelated with each other and derived from different input data sets; obtaining baseband signal samples of the baseband information signal having an in-phase signal sample and a quadrature signal sample; determining a transmitter phase offset based on an estimated correlation between the in-phase signal samples and the quadrature signal samples; performing a plurality of phase measurements using a plurality of antennas to obtain a plurality of phase measurements; correcting the plurality of phase measurements based on the transmitter phase offset to produce a plurality of corrected phase measurement; and calculating an AOA of the received signal based on the difference between the plurality of corrected phase measurements.

17 Claims, 25 Drawing Sheets

Related U.S. Application Data continuation-in-part of application No. 14/727,859, filed on Jun. 1, 2015, now Pat. No. 9,635,634, which is a continuation of application No. 14/043,789, filed on Oct. 1, 2013, now Pat. No. 9,048,979.

(60) Provisional application No. 61/708,116, filed on Oct. 1, 2012, provisional application No. 62/326,091, filed on Apr. 22, 2016.

(51) Int. Cl.
    *H04B 7/06*     (2006.01)
    *G01S 3/18*     (2006.01)
    *H04L 25/02*     (2006.01)
    *H04W 56/00*     (2009.01)
    *H04B 7/08*     (2006.01)
    *G01S 3/46*     (2006.01)
    *H04B 7/0413*     (2017.01)
    *H04L 27/00*     (2006.01)
    *H04B 7/10*     (2017.01)

(52) U.S. Cl.
    CPC .......... *H04B 7/086* (2013.01); *H04L 7/0016* (2013.01); *H04L 25/02* (2013.01); *H04W 56/0035* (2013.01); *H04B 7/0413* (2013.01); *H04B 7/0802* (2013.01); *H04B 7/10* (2013.01); *H04L 27/0014* (2013.01); *H04L 2027/003* (2013.01); *H04L 2027/0046* (2013.01); *H04L 2027/0053* (2013.01); *H04L 2027/0067* (2013.01)

(58) Field of Classification Search
    USPC .................................................. 375/354, 332
    See application file for complete search history.

(56) References Cited

U.S. PATENT DOCUMENTS

| | | |
|---|---|---|
| 7,321,645 B2 * | 1/2008 | Lee .............. H04B 7/086 |
| | | 375/134 |
| 8,918,117 B2 | 12/2014 | Rochberger et al. |
| 9,060,250 B2 | 6/2015 | Alpert et al. |
| 9,144,109 B2 | 9/2015 | Levin et al. |
| 9,430,029 B2 | 8/2016 | Alpert et al. |
| 9,645,242 B2 | 5/2017 | Alpert et al. |
| 9,651,672 B2 | 5/2017 | Alpert et al. |
| 10,278,025 B1 | 4/2019 | Levin et al. |
| 2002/0159534 A1 * | 10/2002 | Duncan ............. H04L 27/266 |
| | | 375/260 |
| 2004/0146122 A1 * | 7/2004 | Fague ............. H04L 27/0014 |
| | | 375/326 |
| 2007/0036247 A1 * | 2/2007 | Capretta ............. H04L 27/22 |
| | | 375/343 |
| 2010/0128824 A1 * | 5/2010 | Hui .................. H04L 27/2671 |
| | | 375/344 |
| 2010/0322288 A1 * | 12/2010 | Kawano ............ H04B 1/71632 |
| | | 375/136 |

* cited by examiner

US 11,085,990 B2

ANGLE OF ARRIVAL MEASUREMENTS USING RF CARRIER SYNCHRONIZATION AND PHASE ALIGNMENT METHODS

CROSS-REFERENCE TO RELATED APPLICATIONS

This application is a continuation of, and claims the benefit of priority under 35 U.S.C. § 120 of, U.S. patent application Ser. No. 15/495,972, filed Apr. 17, 2017 and titled "Angle of Arrival Measurements Using RF Carrier Synchronization and Phase Alignment Methods," which itself claims the benefit of priority both under 35 U.S.C. § 119(e) of U.S. Provisional Patent Application No. 62/326,091, filed Apr. 22, 2016 and titled "High-Resolution High-Dynamic Range Angle of Arrival (AOA) Measurements Using Super Synchronized Wireless Network," and also under 35 U.S.C. § 120 as a continuation-in-part of, and claims priority to, U.S. patent application Ser. No. 14/727,859, filed Jun. 1, 2015 and titled "RF Carrier Synchronization and Phase Alignment Methods and Systems," which itself is a continuation of, and claims priority to, U.S. patent application Ser. No. 14/043,789, filed Oct. 1, 2013 and also titled "RF Carrier Synchronization and Phase Alignment Methods and Systems," each of which is hereby incorporated by reference in its entirety for all purposes. Priority is not claimed by this application to U.S. Provisional Patent Application 61/708,116. Additionally, U.S. Pat. Nos. 9,048,979, 9,048,980, and U.S. Pat. App. Publication No. US20170111197A1, and M. Sliskovic, "Sampling frequency offset estimation and correction in OFDM systems", in IEEE-GlobalComm, vol. 1, 2001, San Antonio; Z. Gao, et al, "Self-Cancellation of Sample Frequency Offset in OFDM Systems in the Presence of Carrier Frequency Offset", IEEE VTC September 2010 Ottawa, Canada; Y. Murin et al, "Efficient Estimation of Carrier and Sampling Frequency Offsets in OFDM Systems", IEEE WCNC '14 Apr. 2014, Istanbul, are hereby incorporated by reference in their entirety for all purposes.

BACKGROUND

Angle of arrival (AOA) measurement is a method for determining the direction of propagation of a radio-frequency wave incident on an antenna. AOA determines the direction by measuring the Time Difference of Arrival (TDOA) at individual elements of an antenna array; the AOA can be calculated from these delays.

Generally, this TDOA measurement is made by measuring the difference in received phase at each element in the antenna array. This can be thought of as beamforming in reverse. In beamforming, the signal from each element is delayed by some weight to "steer" the gain of the antenna array. In AOA, the delay of arrival at each element, which corresponds to the phase of the incident wave, is measured directly and converted to an AOA measurement.

Because AOA measures the difference between two or more received phases, AOA generally relies on multiple antennas coupled in an antenna array.

SUMMARY

Described in this document are multiple ways to obtain angle of arrival (AOA) measurements for use in wireless communications and other applications such as positioning. We describe how angle of arrival (AOA) can be extracted utilizing high-precision carrier offset and initial phase offset estimation methods, resulting in an economical way of sensing arriving angle of an RF signal at a set of antennas. In addition, by making use of our high-precision carrier synchronization technology we present an additional method of sensing arriving angle of RF signals by comparing RF signals arrived in sequential manner. This is an important advantage over the traditional method of having to detect the arriving signals simultaneously at an array of antennas, which causes the overall system to be too expensive or too bulky to be practical for many potential applications such as mobile positioning systems. In this document, we describe how we can utilize our method of sensing arrival angle of RF signals and synchronized communication channels in order to realize positioning systems, either mobile or network-based, much more economically than the traditional alternative approaches.

Additionally, described in this document are ways to accomplish high resolution angle of arrival measurements for positioning using different antenna configurations aided with frequency synchronization technology. Use of such antennas for angle of arrival have traditionally required multiple receivers to process each antenna signal simultaneously. Presented in this document are alternative antenna structures that can be used with a single or more receivers to perform angle of arrival calculations with sequential measurements from each antenna.

In a first embodiment, a method is disclosed for determining an angle of arrival of a received signal, comprising: generating a baseband information signal by mixing a received signal with a local oscillator (LO) signal having an LO frequency, the received signal being an in-phase signal and quadrature signal uncorrelated with each other and derived from different input data sets; obtaining baseband signal samples of the baseband information signal having an in-phase signal sample and a quadrature signal sample; determining a transmitter phase offset based on an estimated correlation between the in-phase signal samples and the quadrature signal samples; performing a plurality of phase measurements using a plurality of antennas to obtain a plurality of phase measurements; correcting the plurality of phase measurements based on the transmitter phase offset to produce a plurality of corrected phase measurement; and calculating an angle of arrival of the received signal based on the difference between the plurality of corrected phase measurements.

In a second embodiment, a method is disclosed for determining an angle of arrival of a received signal, comprising: determining a phase offset of a mobile transmitter relative to an oscillator in a radio frequency (RF) transceiver; receiving a first signal from the mobile transmitter via a first antenna in the RF transceiver; receiving a second signal from the mobile transmitter via the first antenna, the second signal being received after reception of the first signal; comparing the first and the second signal to determine a delay; subtracting the phase offset of the mobile transmitter from the delay to obtain a position-dependent delay component; and determining an angle of arrival based on the position-dependent delay component.

In a third embodiment, a method is disclosed for performing angle of arrival measurements using a synchronized radio transceiver, comprising: synchronizing a carrier frequency of a receiver and a transmitter; measuring, at the receiver, a first measured signal phase for a signal transmitted by the transmitter at a first antenna at a first time; measuring, at the receiver, a second measured signal phase for the signal received at a second antenna at a second time; and calculating an angle of arrival based on a difference of the first and the second measured signal phase and on a physical distance between the first antenna and the second antenna, The first antenna and the second antenna may be coupled to the receiver.

The method may further comprise synchronizing the carrier frequency of the receiver and the transmitter based on cumulative phase offset of orthogonal I and Q baseband samples. The method may further comprise determining a plurality of time differences of arrival to obtain additional angles of arrival in additional spatial planes. The first time may be identical to the second time. An interval between the first and second measurement may be based on a known frame interval of the signal.

In a fourth embodiment, a method is disclosed for determining an angle of arrival of a received signal, comprising: generating a baseband information signal by mixing a received signal with a local oscillator (LO) signal having an LO frequency, the received signal being an in-phase signal and quadrature signal uncorrelated with each other and derived from different input data sets; obtaining baseband signal samples of the baseband information signal having an in-phase signal sample and a quadrature signal sample; determining a transmitter frequency offset based on an estimated correlation between the in-phase signal samples and the quadrature signal samples; performing a first phase measurement for the received signal using a single antenna to obtain a first phase measurement in a first plane; subsequently performing a second phase measurement for the received signal using a second antenna in the first plane; correcting the second phase measurement based on the transmitter frequency offset to produce a second corrected phase measurement; calculating an angle of arrival in the first plane based on the difference between the second and first corrected phase measurements.

The method may further comprise subsequently performing a third phase measurement for the received signal using the first antenna for a second plane orthogonal to the first plane; subsequently performing a fourth phase measurement for the received signal using the second antenna in the second plane; and calculating an angle of arrival in the second plane based on the difference between the third and the fourth corrected phase measurements. The method may further comprise calculating an angle of arrival in three-dimensional space using the calculated angle of arrival in the first plane and the calculated angle of arrival in the second plane.

In a fifth embodiment, an antenna configuration for a radio frequency (RF) transceiver is disclosed, comprising: a first antenna on a flat plane; a second antenna on the flat plane at a first distance from the first antenna along a first axis; a third antenna on the flat plane at a second distance from the first antenna along a second axis perpendicular to the first axis; a fourth antenna on the flat plane at a first distance from the second antenna along the first axis and at the second distance from the third antenna along the second axis; a single pole switch having a first throw connected to the first antenna, a second throw connected to the second antenna, a third throw connected to the third antenna, and a fourth throw connected to the fourth antenna; and a radio transceiver coupled to an output of the single pole switch, The first, second, third, and fourth antennas may be circularly polarized corner truncated patch antennas, thereby enabling the RF transceiver to perform sequential phase or time measurements for calculating angle of arrival. The first distance and the second distance may be identical. The single pole switch may be on a second flat plane and connected to the first, second, third, and fourth antennas by vias.

In a sixth embodiment, an antenna configuration for a radio frequency (RF) transceiver is disclosed, comprising: a first antenna on a flat plane; a second antenna on the flat plane connected serially to the first antenna along a first axis; a third antenna on the flat plane connected serially to the first antenna along a second axis perpendicular to the first axis; a fourth antenna on the flat plane at a first distance from the first antenna along the first axis; a fifth antenna on the flat plane connected serially to the fourth antenna along the first axis; a sixth antenna on the flat plane connected serially to the fourth antenna along the second axis; a seventh antenna on the flat plane at the first distance from the first antenna along the second axis; a eighth antenna on the flat plane connected serially to the seventh antenna along the first axis; a ninth antenna on the flat plane connected serially to the seventh antenna along the second axis; a single pole switch having a first throw connected to the first and third antennas, a second throw connected to the fourth and sixth antennas, a third throw connected to the seventh and ninth antennas, a fourth throw connected to the first and second antennas, a fifth throw connected to the fourth and fifth antennas, and a sixth throw connected to the seventh and eighth antennas; and a radio transceiver coupled to an output of the single pole switch, The first, second, third, fourth, fifth, sixth, seventh, eighth, and ninth antennas may be patch antennas, thereby enabling the RF transceiver to perform sequential phase or time measurements for calculating angle of arrival.

Phase measurements may be delay measurements. The predicted phase measurement may be based on a measured frequency offset and initial phase of the received signal. The plurality of patch antennas may further comprise four circularly polarized corner truncated patch antennas, and The switching means comprises a single pole four throw (SPOT) switch. The plurality of patch antennas may further comprise higher gain or higher directivity antennas for increasing range of operation. The plurality of patch antennas may further comprise two serially connected patch antennas for x-z polarized signals and two serially connected patch antennas for y-z polarized signals. A first patch antenna and a second patch antenna may be connected to the switching means via a first via, and the first patch antenna and a third patch antenna, perpendicularly oriented relative to the first and second patch antennas, may be connected to the switching means via a second via. The plurality of patch antennas may further comprise nine patch antennas, and the switching means may further comprise a single pole six throw (SP6T) switch. The plurality of patch antennas may further comprise six patch antennas, and the switching means may further comprise a single pole three throw (SP3T) switch. The plurality of patch antennas may further comprise four patch antennas, and the switching means may further comprise two pairs of single pole two throw (SP2T) switches coupled to two power combiners. The plurality of patch antennas may further comprise four patch antennas, and the switching means may further comprise two pairs of single pole two throw (SP2T) switches coupled to two power combiners and the two power combiners coupled to a fifth single pole two throw (SP2T) switch.

DETAILED DESCRIPTION

The present disclosure takes advantage of the methods of achieving highly accurate RF Carrier Synchronization and Phase Alignment as described in U.S. Pat. Nos. 9,048,979 and 9,048,980. Our disclosed methods utilize statistical nature of random quadrature modulated signal in order to accurately measure frequency offset and initial phase offset in the received carrier signal.

Our method of measuring angle of arrival uses standard widely available commercial off the shelf radio equipment and supports different antenna configurations.

See U.S. Pat. No. 9,048,980 and the other documents referred to herein (each hereby incorporated by reference in their entirety) for a detailed description of the RF Carrier Synchronization and Phase Alignment Methods that allows a highly accurate carrier frequency offset measurement in the order of 1 ppb or better and initial phase offset measurement in the order of 0.1 degrees or better. Also in these documents is a description of a frequency domain approach to achieving the similar results.

Once angle of arrival from a target is accurately determined, whether in a 2-D or 3-D configuration, it is possible to calculate its position accurately either through solely using multiple angle of arrival measurements or in combination with other measurements such as TDOA (Time Difference of Arrival) or round trip time.

Positioning Background. Angle of arrival measurements typically relies on multiple receivers performing time difference of arrival (TDoA) measurements. Signal transmitted by the target device is received simultaneously at a minimum of 2 antennas separated by a certain distance. Time difference of arrival between 2 antennas is calculated by measuring the received signal phase at 2 antennas simultaneously.

Figure 1A:
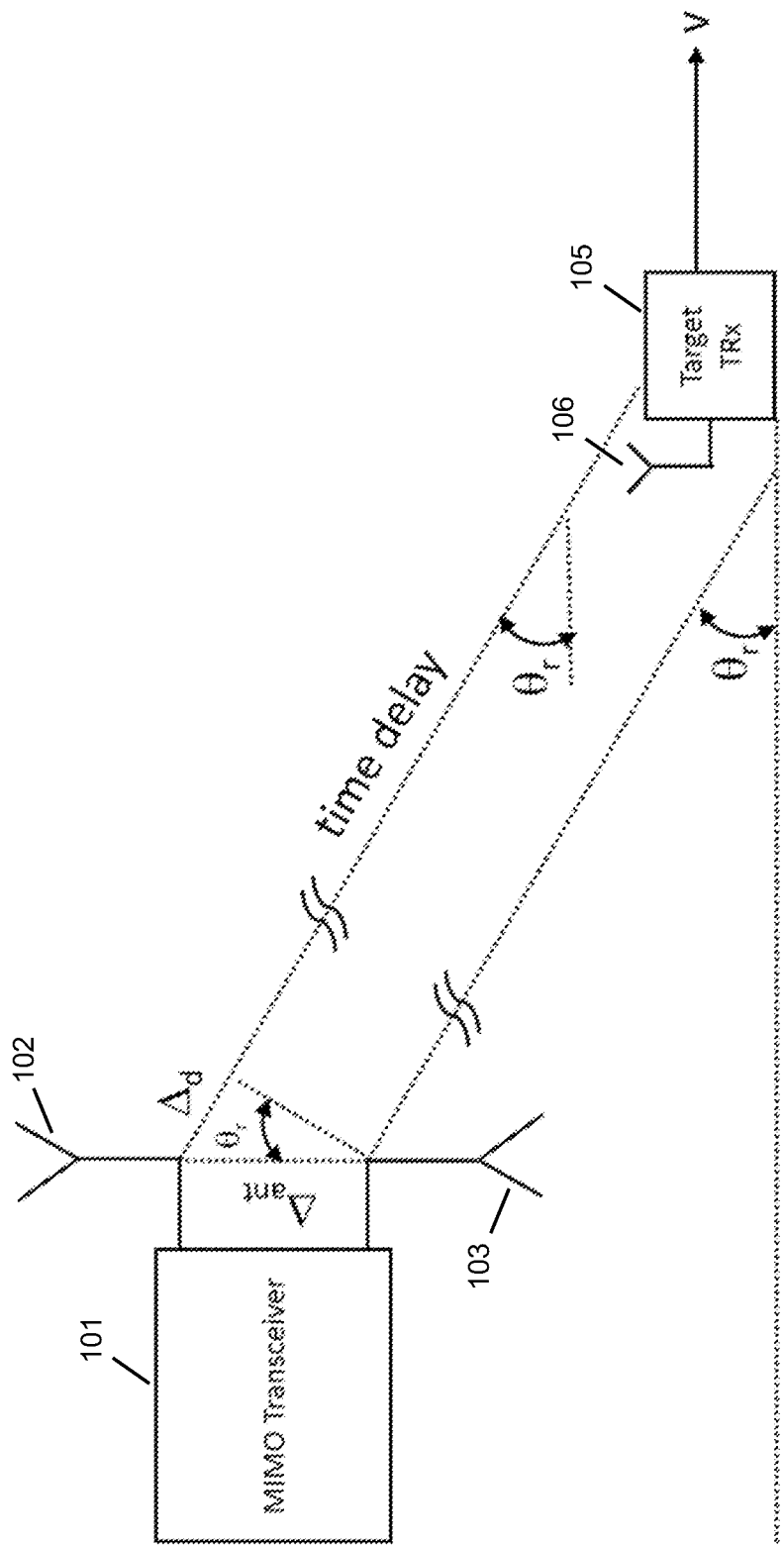
FIG. 1A is a schematic diagram of a typical prior art measurement configuration.

FIG. 1A is a schematic diagram of a typical prior art measurement configuration, showing AOA measurement using MIMO transceivers. MIMO transceiver 101 has two antennas, 102 and 103, and is in communication with target transceiver (TRX) 105, which has its own antenna 106. Target transceiver 105 may be moving at speed v. Assuming a transmitter in the far field, radio waves incident on 2 antennas separated by a distance of $\Delta_{ant}$ will be approximately parallel to each other and difference of initial phase offsets or equivalent distance $\Delta_d$ will determine the angle of arrival Or with the simple trigonometric relationship: $\sin \theta_r = \Delta_d / \Delta_{ant}$.

Accurate angle of arrival measurement is improved by the phase and frequency synchronization of the 2 receivers in the MIMO system, so that the phase difference of signal arriving at the two different antennas can be measured with acceptable accuracy.

Figure 1B:
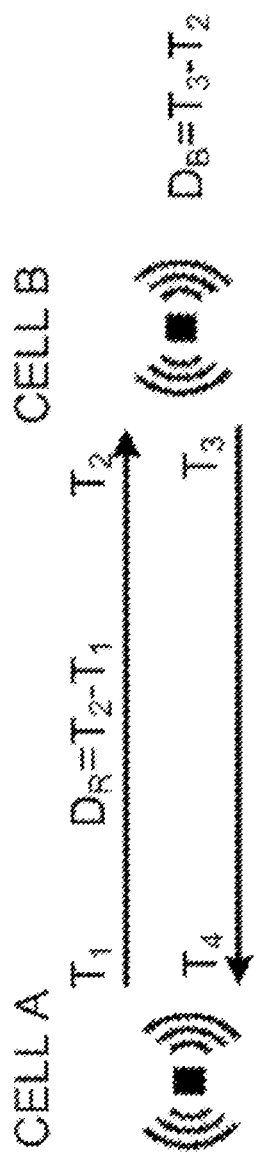
FIG. 1B is a timing diagram of a time synchronization algorithm, in accordance with some embodiments.

FIG. 1B is a timing diagram of a time synchronization algorithm in accordance with some embodiments. With respect to FIG. 1B, the calculations for the Range (Distance) between two nodes (Cell A and Cell B), once the two nodes are frequency synchronized, will be described. T.sub.1: time information at cell A is sent to cell B (T.sub.1A); T.sub.2: T.sub.1A received time at B (T.sub.2B); T.sub.3: time information sent from cell B to cell A (T.sub.2B, T.sub.3B); T.sub.4: T.sub.2B, T.sub.3B received time at cell A (T.sub.4A); T.sub.1A and T.sub.4A are local time at cell A, T.sub.2B and T.sub.3B are local time at cell B; D.sub.R is the actual time delay due to the distance (range delay); D.sub.B is the processing time delay at cell B; {tilde over (D)} {tilde over (D.sub.R)} is the range delay estimate calculated at cell A, and ε.sub.fA, ε.sub.fB are the reference frequency errors at cell A and cell B.

Here T.sub.1, T.sub.z, T.sub.3, T.sub.4 denote ideal time. The above example described with respect to FIG. 1A illustrates how Cell A may determine the distance between Cell A and Cell B from a single exchange of time information. First, Cell A sends its local time information (T.sub.1A) at time T.sub.1. Then, Cell B records the arrival time (T.sub.2) according to its local time, which is denoted as T.sub.2B. Cell B then transmits back to Cell A this arrival time at time T.sub.3 along with the transmit time (T.sub.3B). These two values (T.sub.2B and T.sub.3B) are all that Cell A needs in order to determine what the actual time delay is due to the actual distance between the two Cells because it has a synchronized reference frequency. The derivation of the delay expression is shown below.

DR~=0.5{(T4A−T1A)−(T3B−T2B)}=0.5{(T4−T1)(1+fA)−(T3−T2)(1+fB)}=DR(1+fA)+0.5DB(fA−fB).apprxeq.DR+0.5DB(fA−fB)(3.23)     ##EQU00011##

Here, ε.sub.fA and ε.sub.fB represent reference frequency error at nodes cell A and cell B respectively expressed in fraction, e.g., if cell A has 1 ppm of frequency error, ε.sub.fA would be 1e−6. The D.sub.R value is calculated, which represents the time delay of a radio wave travelling at the speed of light from Cell A to Cell B. This value will be in general quite small; for example, 300 meter distance will cause 1 us time delay. On the other hand, D.sub.B represents the processing delay at Cell B which can easily be several milliseconds. Therefore, as can be seen in equation (3.23), when the two nodes are not synchronized in frequency, the resulting calculation can easily be dominated by this process delay time, D.sub.B, which makes this method ineffective. However, once the two nodes are frequency-synchronized, the second term in (3.23) drops out and the calculation accurately shows the actual time delay between the two nodes.

As can be seen in this calculation the delay estimate error is a function of the relative frequency error (synchronization error) and the absolute frequency error has negligible impact on the accuracy of the range delay calculation as long as the frequency error at both cells are the same—in other words, as long as ε.sub.fA=ε.sub.fB. It also shows that the absolute time error cancels out in the delay expression, and it has a negligible impact on the accuracy of the range delay, D.sub.R measurement.

Thus in still further embodiments, the synchronization techniques may be used in conjunction with a time synchronization protocol as described with respect to FIG. 1B.

Further embodiments include the use of the above-described frequency synchronization techniques for network time synchronization. Once network nodes are able to achieve a high-degree of frequency synchronization using the methods and devices described above, network time synchronization may be achieved by various nodes in the network. Since all nodes are synchronized in their reference frequency and their relative distances can also be determined according to the method described above, each node may engage in an exchange of time information from a reference node (a master node), which provides the master clock for the network. Since the time delay from the master node can precisely be measured using the positioning method described above (or in many applications, it might be already known by other means), each node can calculate the precise time synchronized to the master clock from a single exchange of time information. Frequency and time synchronization steps could repeat at a set interval to maintain a high degree of synchronization against temporal perturbations in the network.

Positioning systems employing the frequency synchronization technique may include mobile-to-mobile positioning systems, mesh network systems, and network systems.

Figure 1C:
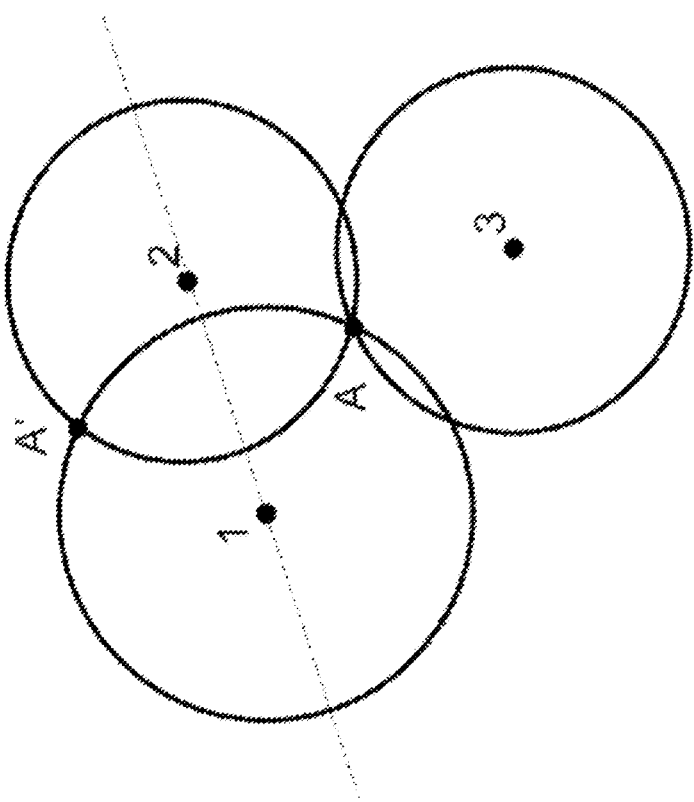
FIG. 1C is a diagram of a positioning algorithm, in accordance with some embodiments.

FIG. 1C is a diagram of a positioning algorithm in accordance with some embodiments. In a mobile-to-mobile positioning system, the frequency synchronization and positioning algorithms and methodology described above may be employed in a group of radios that are designed to communicate to one another. Given any two radios in communication, the methods described above allow both parties to calculate the distance between the two.

In addition, because the frequency synchronization algorithm also extracts the phase offset of the arrived signal as a bi-product, the use of a multi-input receiver also allows the system to calculate the arrival angle of the incoming radio wave simply by comparing this phase offset adjustment at the two inputs of the receiver. Having the angle of arrival along with the distance information allows one radio unit to locate the target location in two-dimensional space such as flat surface areas. If the Receiver is equipped with three receivers, the target can be located in three-dimensional space.

Figure 1D:
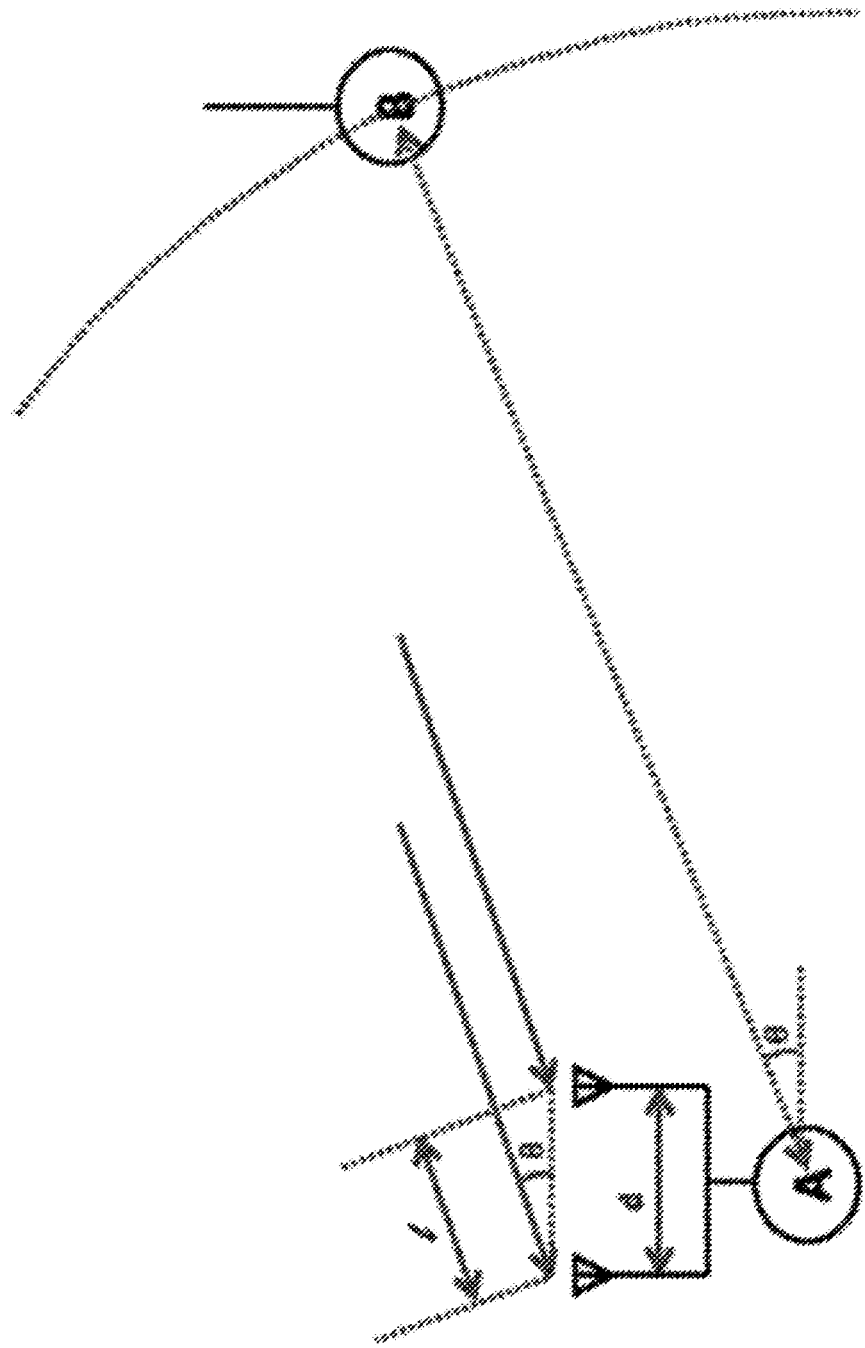
FIG. 1D is a diagram of a angle of arrival positioning algorithm, in accordance with some embodiments.

FIG. 1D is a diagram of a angle of arrival positioning algorithm, in accordance with some embodiments.

The mobile-to-mobile positioning system is illustrated in FIG. 1D, where:

cos θ=1 d and 1.lamda.=Δ.phi.2     ##EQU00012##

And therefore,

θ=cos−1(cΔ.phi.2.pi.df)     ##EQU00013## where Δ.phi. is the phase offset difference between two received signals at node A, and .lamda. and f are the wavelength and frequency, and c is the speed of light.

Figure 1E:
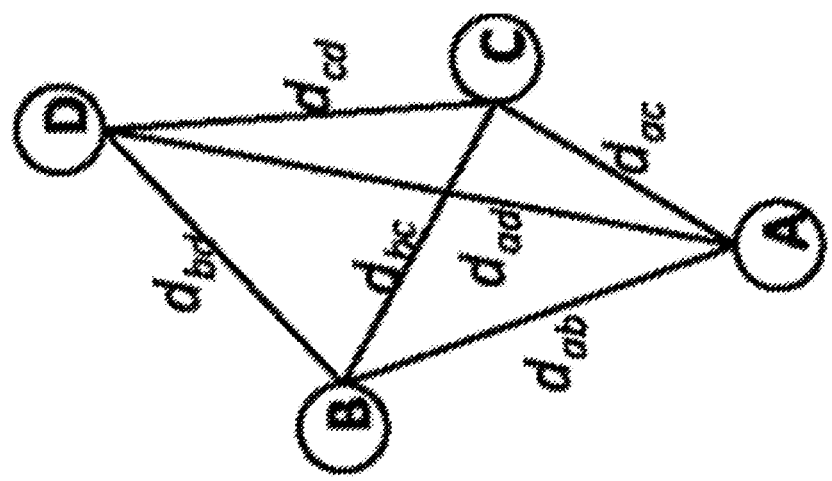
FIG. 1E is a diagram of a positioning algorithm, in accordance with some embodiments.
Figure 1E:
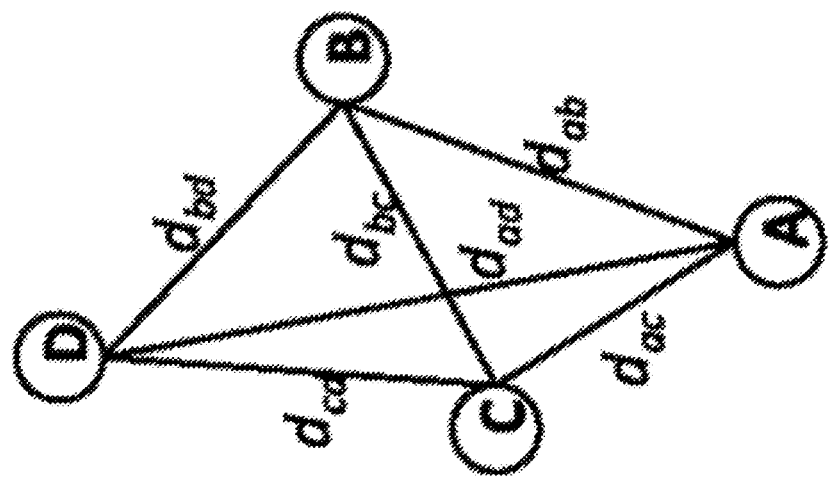

FIG. 1E is a diagram of a positioning algorithm, in accordance with some embodiments. In a mesh network positioning system, a mesh network with multiple individual mobile radios can collectively use the frequency synchronization and positioning algorithms described above in order to determine relative positions of each of the mesh nodes. Described below is the case with four mobile units where each unit can figure out the distance to the other three units using the method described above. By sharing the distance information from one another the nodes can determine that the relative location of all four with respect to one another can only have two possible solutions. Therefore, only with one extra piece of information addressing the acceptable orientation of the two solutions, the nodes can determine exactly where each node is with respect to one another using the positioning method described above. Furthermore, figuring out initial orientation only requires three units to initialize their relative location and orientation. This can easily be accomplished as initialization process for the mesh network prior to deploying the network.

In a network-based positioning system, frequency and time synchronization of all the network nodes is achieved using the methods described above. Once this is accomplished, the network can determine where the individual mobile units are located. Two methods of locating individual users (User Equipments: UE) in a network are described below.

Figure 1F:
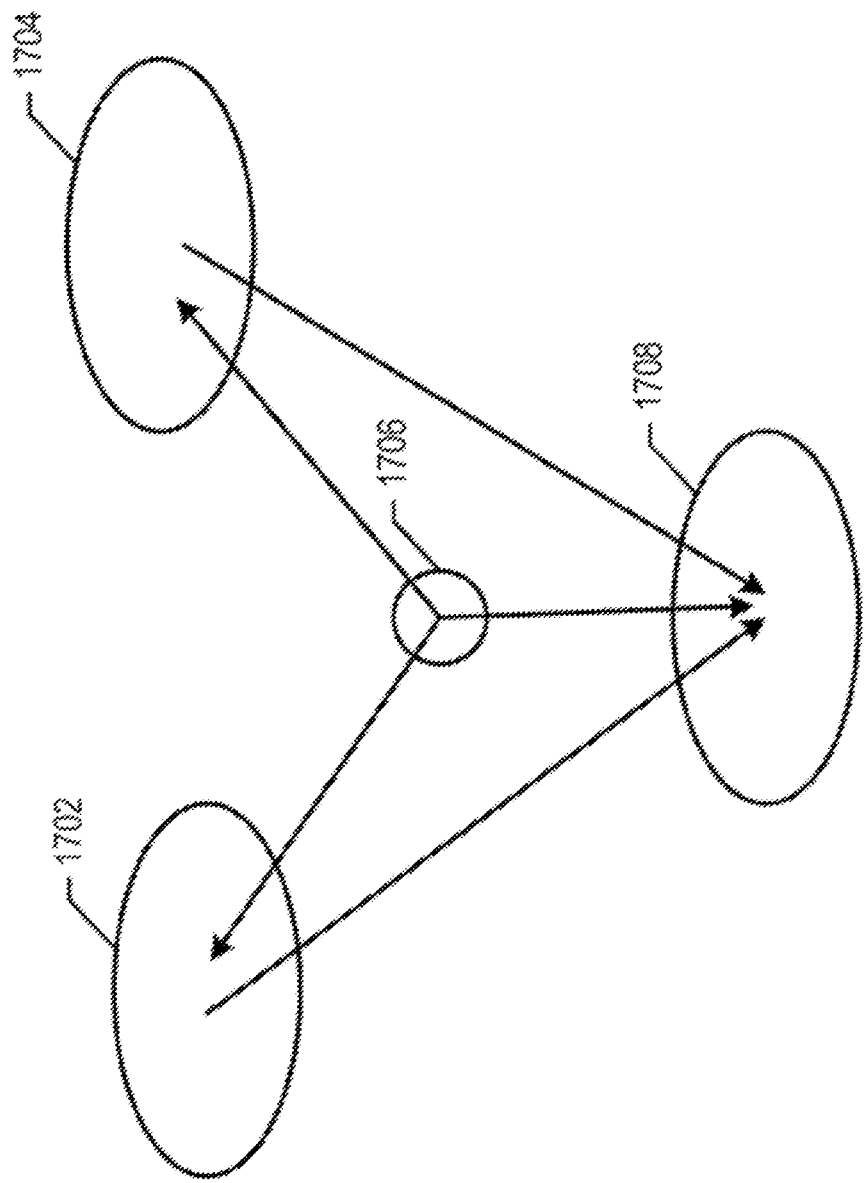
FIGS. 1F and 1G are message flow diagrams of positioning algorithms, in accordance with some embodiments.
Figure 1G:
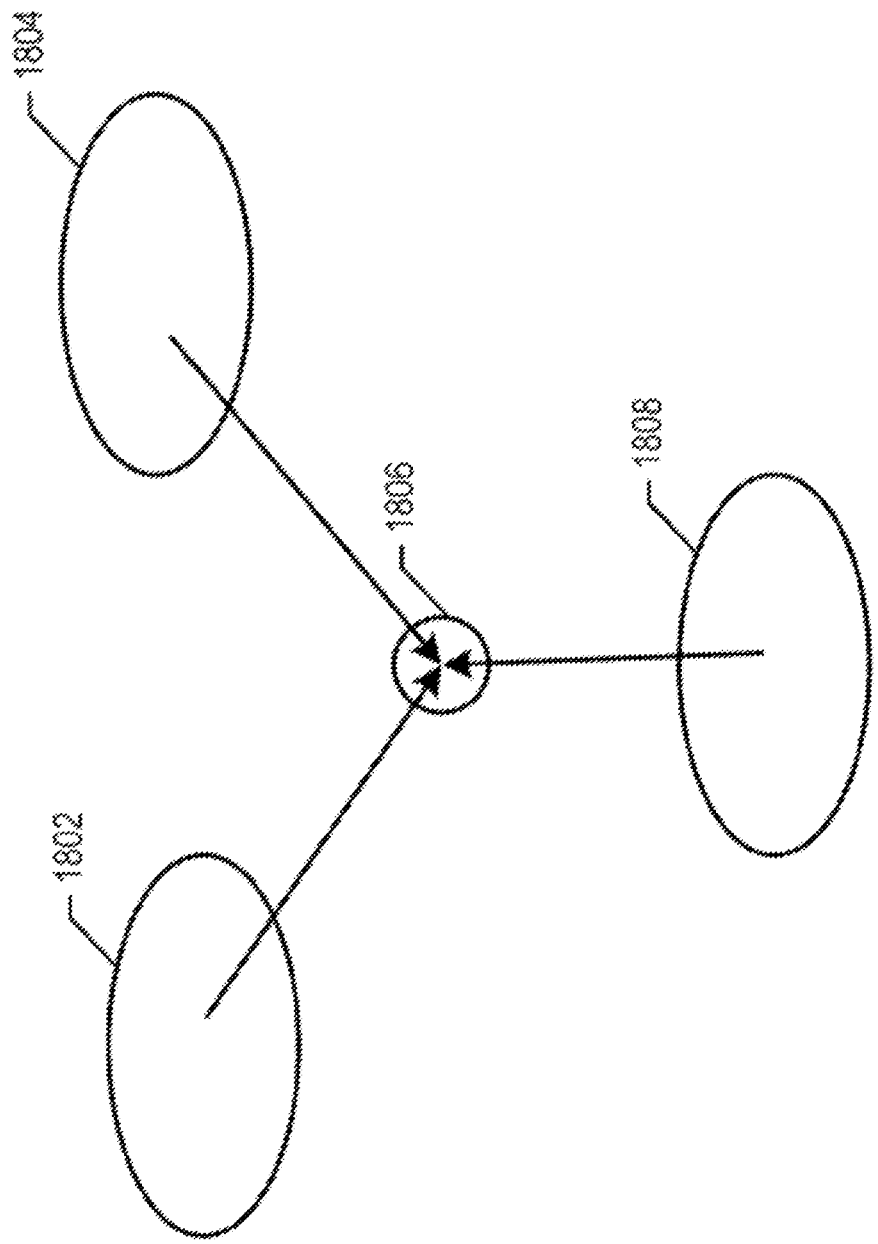

FIGS. 1F and 1G are message flow diagrams of positioning algorithms, in accordance with some embodiments. In a network-based positioning system, uplink signals, as shown in FIG. 1F, may be used. Because the network nodes are already "perfectly" synchronized, the network may compare the arrival times of the mobile unit signal from mobile unit 1708 from several network nodes 1702, 1704, and 1708 (e.g., base stations). In the embodiment of FIG. 1F, the arrival times at network nodes 1702 and 1704 are conveyed to node 1708 for comparison. The difference in arrival time indicates the difference in distance between the mobile unit and the network nodes. Ideally only three measurements involving three network nodes may be used to locate the mobile unit in a three dimensional space. In this method, positioning of mobile unit does not require the mobile unit radio (UE) to be synchronized with network nodes. This method also requires no calculation to be performed in mobile unit.

In network-based positioning systems, downlink signals may be used as shown in FIG. 1G. In this embodiment of the network-based positioning system utilizing the frequency synchronization and positioning algorithms described herein, network nodes 1802, 1804, and 1808 broadcast timing and positioning information. Individual mobile units such as unit 1806 may receive these signals from the multiple network nodes (base stations) and calculate its own position using a trilateration method.

High-resolution carrier frequency offset and initial phase offset measurements using modulated signals enable the below methods.

Figure 2:
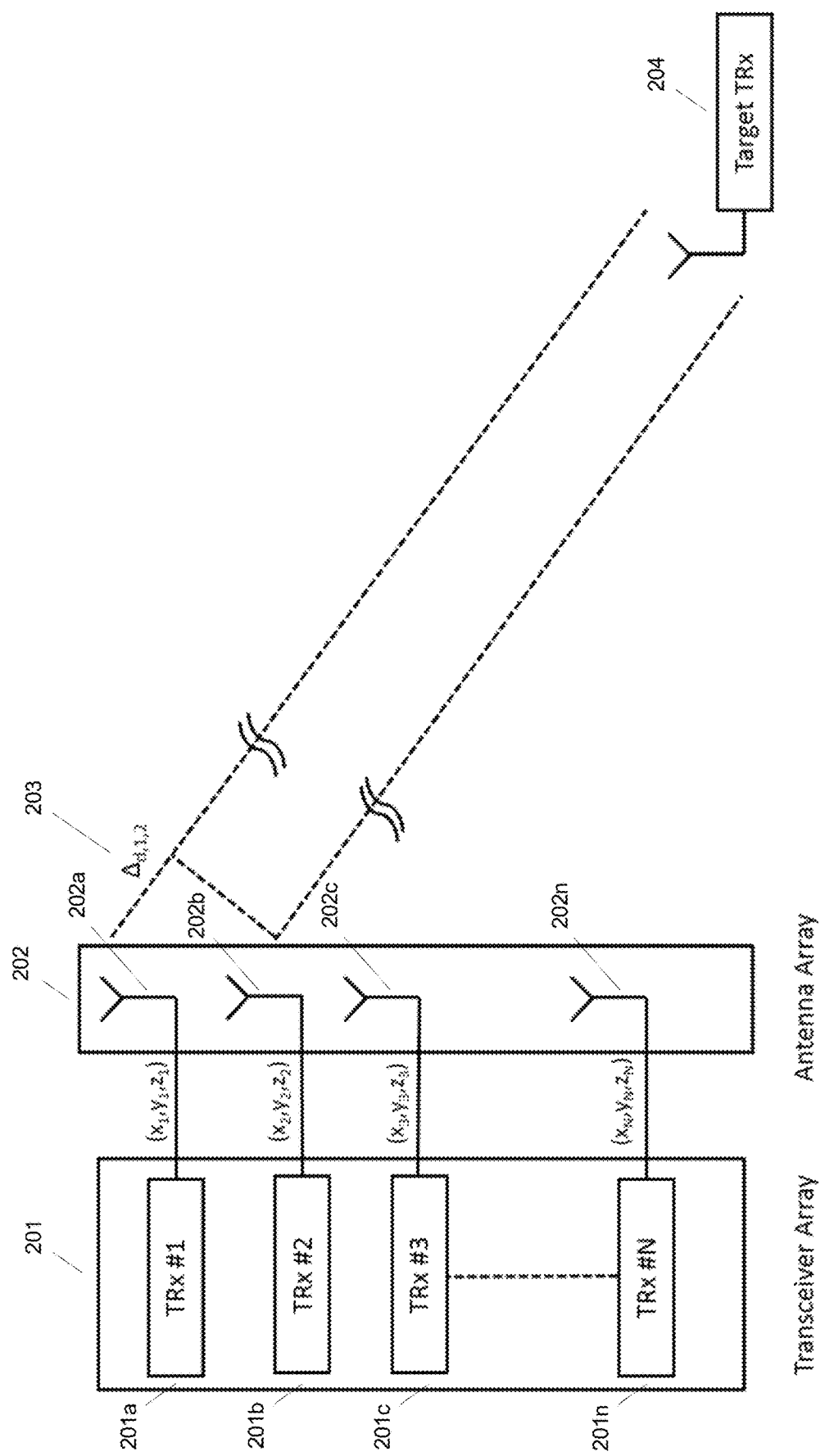
FIG. 2 is a schematic diagram of an angle of arrival calculation system with multiple transceivers connected to individual antennas in an antenna array, in accordance with some embodiments.

The disclosed methods may be used with a variety of AOA measurement configurations: Angle of arrival setup with multiple transceivers (transmitter and receiver) connected to individual antennas in an antenna array as shown in FIG. 2; angle of arrival setup utilizing only a single transceiver: One receiver connected to an array of antennas through switches as shown in FIG. 3; and Extension of the angle of arrival setup above (a single transceiver connected to a set of antennas through switches) to multiple sets where these multiple sets are synchronized by a common phase/frequency reference as shown in FIG. 4.

FIG. 2 shows multiple transceiver and antenna arrays for AOA measurement. Transceiver array 201 includes transceivers (TRXs) 201a, 201b, 201c, . . . 201n, matched to antennas in an antenna array 202, eg., antennas 202a, 202b, 202c, . . . 202n. Each transceiver receives its own signal from target TRX 204, each via its own antenna, each with a slightly different phase. The difference in phase is due to a slightly different distance that is traveled by the signal. By examining the differences in phase it is possible to determine AOA 203 according to the methods described herein.

Figure 3:
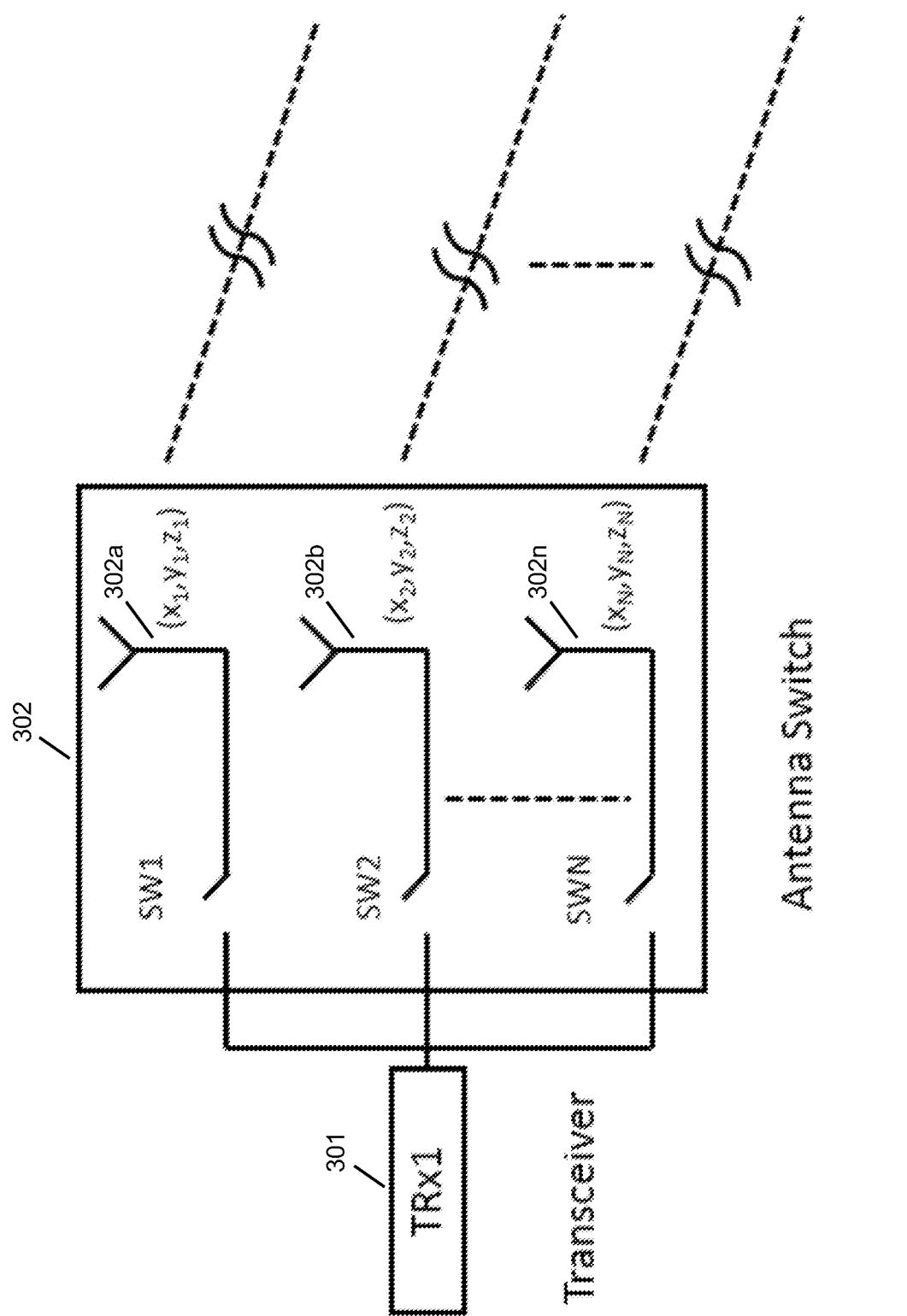
FIG. 3 is a schematic diagram of an angle of arrival calculation system utilizing only a single transceiver coupled to a set of antennas, in accordance with some embodiments.

FIG. 3. AOA measurement method utilizing only a single transceiver. In FIG. 3, one transceiver 301 is connected to an array of antennas 302 (including antennas 302a, 302b, . . . 302b) via an antenna switch. This enables the same transceiver 301 to perform the function of all of the transceivers in the transceiver array 201 in FIG. 2; however, this is possible because transceiver 301 need not sample all the antennas at the same time because the disclosed methods allow accurate distinguishing of the target TRX's frequency offset and the phase offset of the received signal for any arbitrary received signal at any time.

Figure 4:
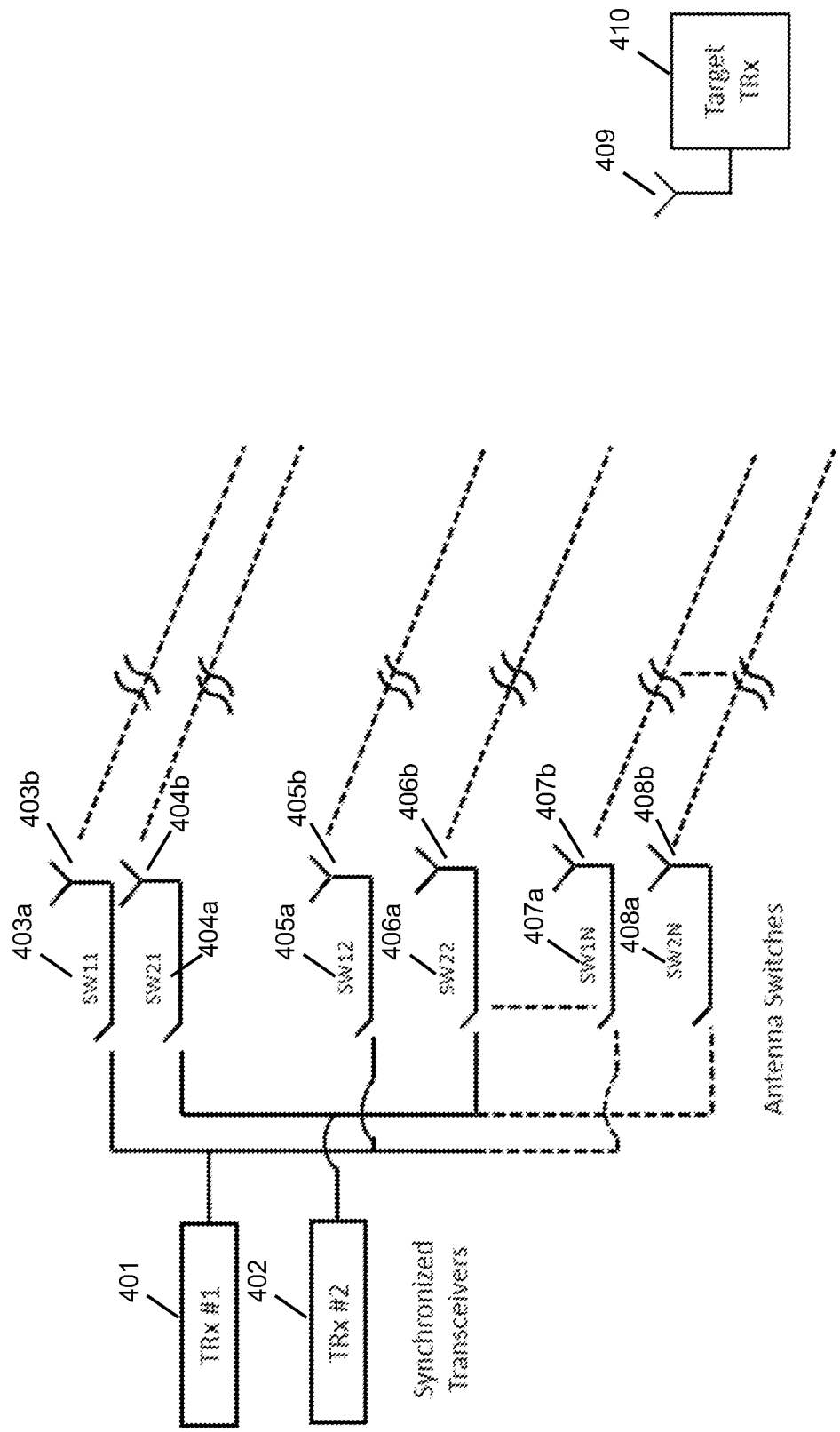
FIG. 4 is a schematic diagram of an angle of arrival calculation system with a plurality of transceivers coupled to a set of antennas, in accordance with some embodiments.

FIG. 4. Two sets of AOA measurement transceivers 401, 402, using the method shown in FIG. 3, are combined to form N-number of 2 antennas sets in switching array connected to respective individual synchronized transceivers, all receiving from target TRx 410 and antenna 409. Switch 403a connects TRX 401 to antenna 403b. Switch 405a connects TRX 401 to antenna 405b. Switch 407a (representing any number of switches) connects TRX 401 to antenna 407b (representing any number of antennas). Switch 404a connects TRX 401 to antenna 404b. Switch 406a connects TRX 401 to antenna 406b. Switch 408a (representing any number of switches) connects TRX 401 to antenna 408b (representing any number of antennas).

Extension of the angle of arrival setup above (a single transceiver connected to a set of antennas through switches) to multiple sets in separate physical locations where frequency and phase synchronization between separate units are achieved wirelessly using the disclosed methods.

The RF Carrier Synchronization and Phase Alignment Method disclosed in U.S. Pat. No. 9,048,980 can provide frequency offset measurements in the order of 1 ppb and the initial phase offset measurements in the order of 0.1 degree or better of the arriving modulated carrier signals. This disclosed method has the feature of being able to sense the phase rotation (of I and Q data) with respect to its original transmitted phase, based on sensing modulated signals without having to detect the actual data, which makes this method attractive to many applications. For instance, our method makes it possible to sense precisely the arrival angle of any wireless data transmitted in the air without any special requirements in formatting of the transmit signals.

The disclosed method also takes advantage of high degree of carrier frequency synchronization between the transceiver and receiver nodes. This high degree of synchronization makes it possible to compute the arrival angle differences between the antennas within the antenna array while allowing receivers or a single receiver to measure the arriving signals at different antennas at different times by switching between antennas in sequence. This is an important difference to the conventional method where it is necessary to capture the arriving angles at different antennas simultaneously for valid calculation of arrival angle. This feature our disclosed method allows the reduction of the required receivers in a given antenna array system to as few as one single receiver—as compared to N receivers for N antenna. This reduction in required receivers is an important advantage in terms of cost, form-factor, and power, which opens up many disclosed commercial applications that were previously deemed impractical.

The disclosed method of AOA measurement technique can also improve the positioning accuracy when combined with other trilateration techniques based on arriving signal's time delay measurements. Extra information provided by the angle of arrival measurement in such a combined method directly translates to improved positioning accuracy by reducing the uncertainty.

The disclosed method uses the same radio hardware used in a typical communication networks where all measurements and calculations can be performed in digital-domain and can be augmented directly into existing wireless networks such as WiFi or Cellular networks. It can also be implemented in an ad-hoc wireless network.

An AOA Measurement Setup using Multiple Receivers follows.

Figure 5:
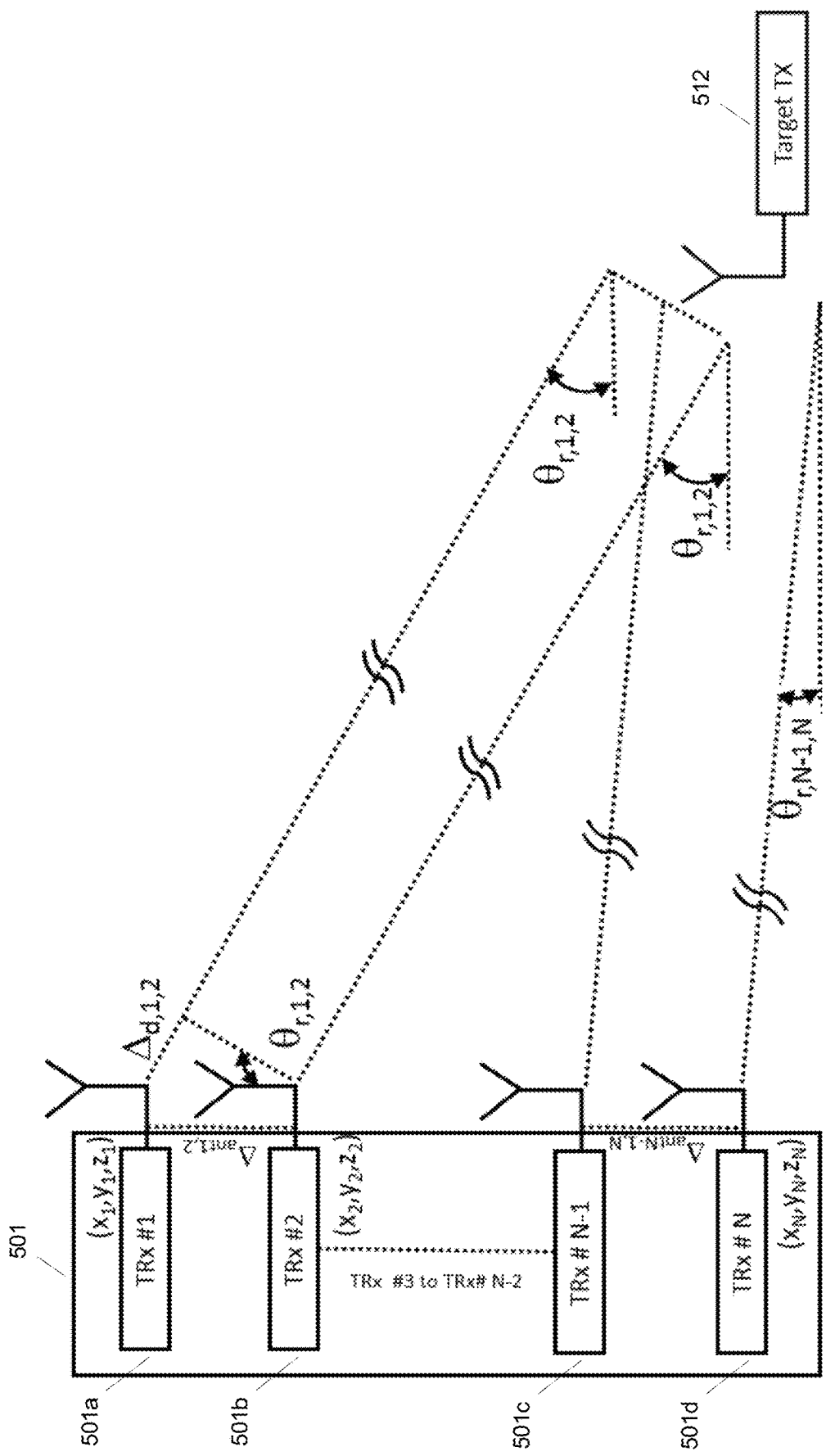
FIG. 5 is a schematic diagram of a MIMO system with two or more antennas plus transceiver units, in accordance with some embodiments.

The traditional angle of arrival measurement setup has a set of transceivers (transmitter and receiver) connected to set antennas in an antenna array. One typical example is a MIMO system with two or more antennas plus transceiver units as shown in FIG. 5. Antenna array here could be as complicated as in actively scanning phased array systems with hundreds of antennas; however, the principle remains the same.

FIG. 5. Angle of arrival measurements with a MIMO transceiver with N receivers and N antennas. Transceiver array 401 includes TRXes 501a, 501b, 501c, 501d. The transceivers are paired, as the transceivers are arrayed in a MIMO configuration, such that 501a and 501b are paired, and some number of paired transceivers, including paired transceivers 501c, 501d are present. Each pair of transceivers receives the same signal from target TRX 512.

Assuming an approximately parallel path to each receiver, angle of arrival can be calculated from $\theta_r = \arcsin(\Delta_d/\Delta_{ant})$ by using difference of initial phase offset measurements at different antennas. Initial phase offset measured at each antenna can be used to determine $\Delta_d$ as $$\Delta_{d,n,k} = \frac{c}{2\pi f}(\phi_n - \phi_k) \quad (1)$$

where $\phi_n$ and $\phi_k$ are initial phase offsets measured at antennas n and k.

The disclosed blind, yet highly-precise carrier synchronization technology produces initial phase offset measurement with a high degree of accuracy as a byproduct of our algorithm. This convenient byproduct enables our system to be able to measure the angle of arrival (AOA) from a target transmitter during the normal streaming of data; therefore, without sacrificing data throughput or without having to deploy specialized transmit sequences or beacon signals.

An Angle of Arrival Measurement Setup using SISO (single input single output) Transceiver with Switching Antennas follows.

Since our RF Carrier Synchronization and Phase Alignment Method allows us to synchronize the phase and frequency between the target transmitter and measurement unit receiver with better than 1 ppb precision, we can use a single receiver to measure angle of arrival accurately.

Figure 6:
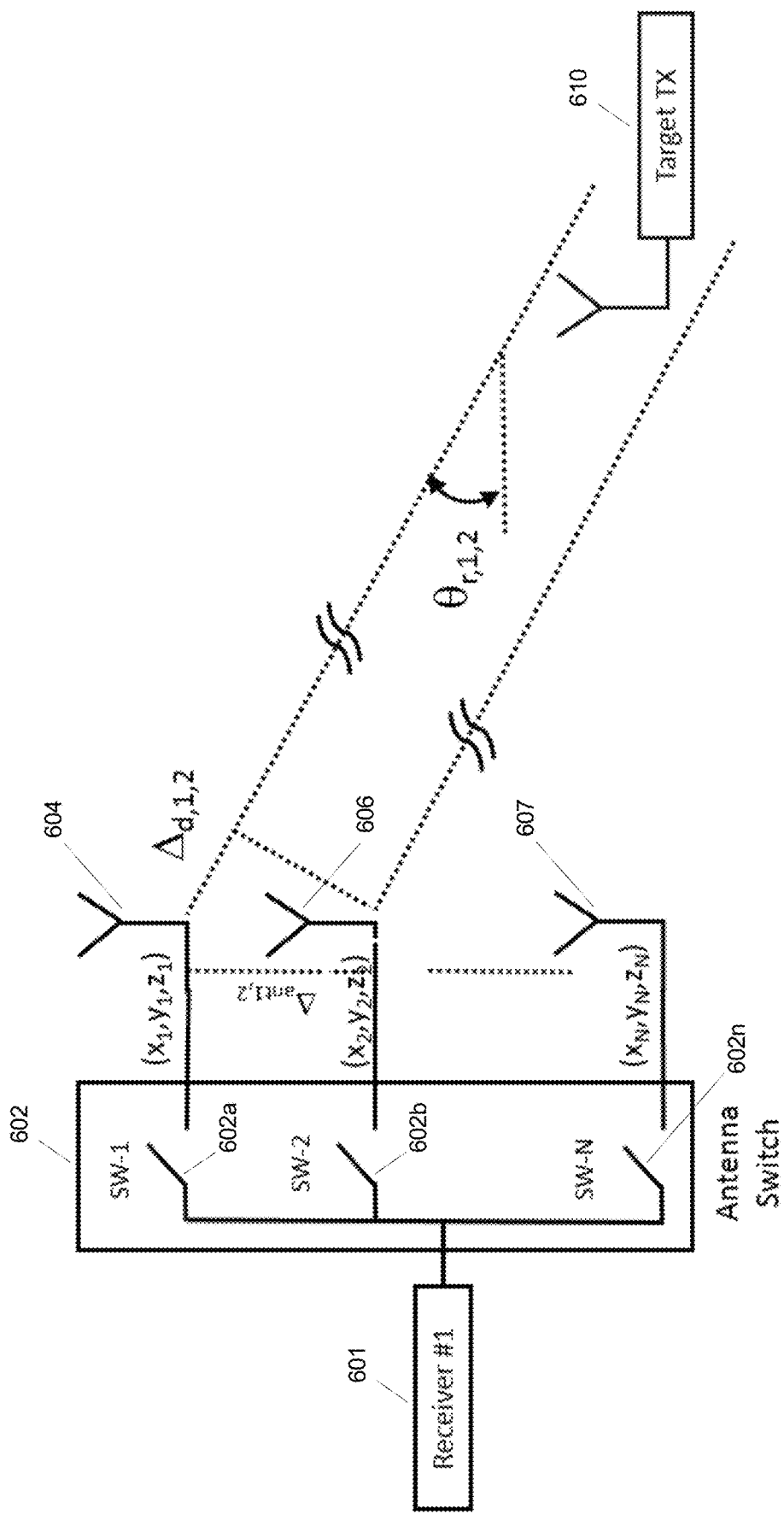
FIG. 6 is a schematic diagram of a single receiver switching between different antennas, in accordance with some embodiments.

FIG. 6 shows a single receiver switching between different antennas at a given time interval to determine the initial phase offset at each antenna after achieving a high-degree of carrier frequency synchronization with the target transmitter using our RF Carrier Synchronization and Phase Alignment Method. Receiver 601 is connected to antenna switch 602, which includes switches 602a, 602b, ... 602n, connecting to antennas 604, 606, and 607, respectively. Each antenna receives the same signal from target TRX 610.

The importance of achieving high-degree of synchronization for this approach is that the amount of phase rotation during each time interval taken up by individual antenna segment becomes insignificant or small enough to be compensated accurately only if a sufficiently high degree of carrier synchronization has been achieved between the two nodes (target and receiver). The high degree of synchronization achieved through our patented technology makes this method possible.

Figure 7:
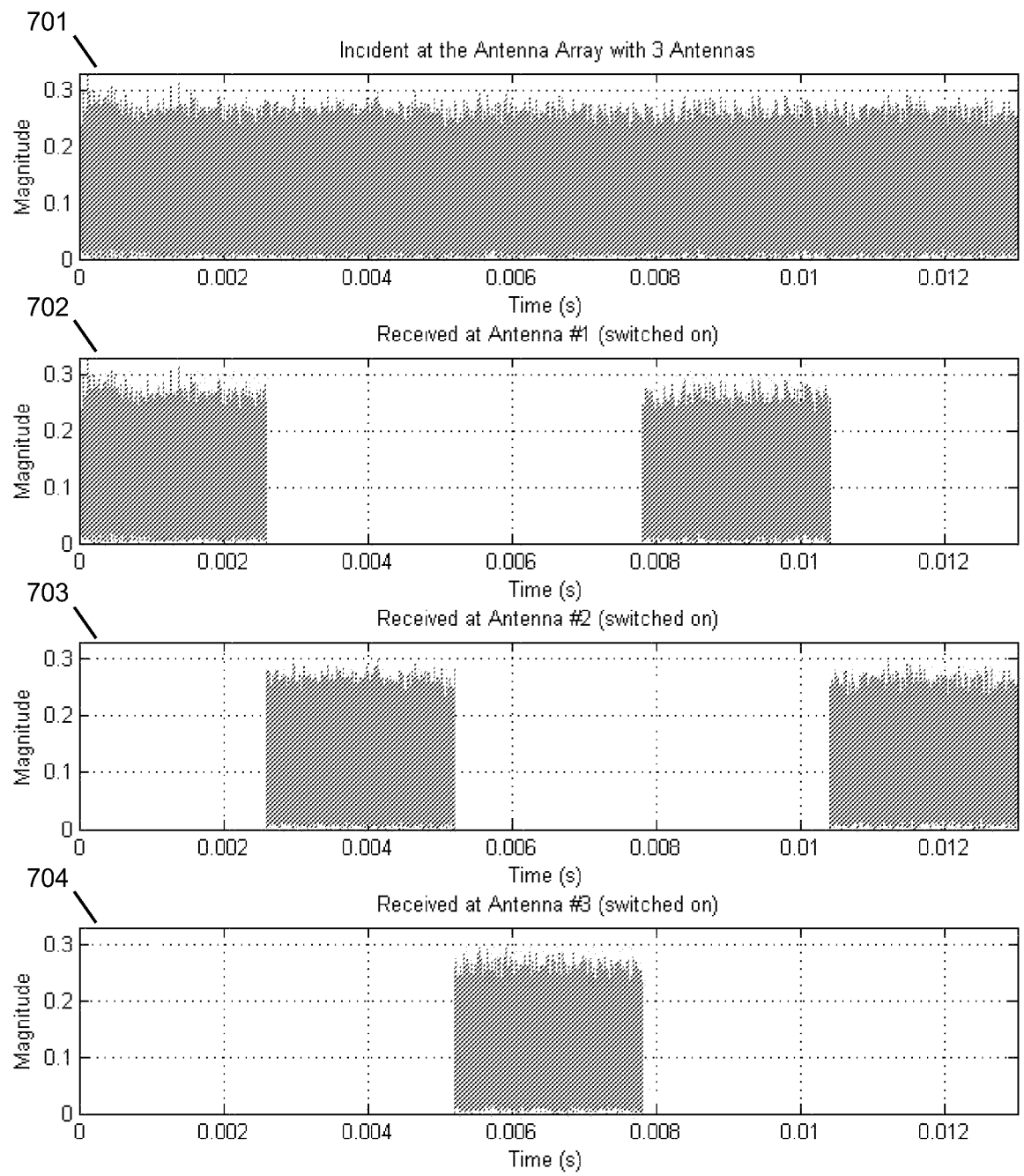
FIG. 7 is a schematic diagram of sequential processing of received signals, in accordance with some embodiments.

FIG. 7. Single receiver with multiple switched antennas example with a three-antenna array. 701 shows a portion of a signal incident at the entire antenna array. 702 shows a portion received at antenna 1. 703 shows a portion received at antenna 2. 703 shows a portion received at antenna 3. As the single receiver switches in sequence between the antennas in an array, received signals are processed sequentially as shown in FIG. 7 to calculate both frequency offset and initial phase offset. When nodes are stationary, net effect in a synchronized network is as if multiple receivers are processing the received data simultaneously. For example, using a single receiver we can measure initial phase offset from antenna 1 during 0 to 2.5 ms, and then measure phase offset from antenna 2 during 2.5 ms to 5 ms, and then take the difference in two measurements as the difference in phase offset. When the receiver is in sync with the transmitter source this approach produces the same outcome as the case where two receivers are used at two different antennas simultaneously capturing the initial phase offset— the conventional approach.

When small amount of frequency offset is present between the target transmitter and measuring receiver, these offsets can be calibrated out from the initial phase offset measurements by taking into account the amount of phase rotation during the time interval. However, this compensation is only possible without losing the accuracy of the outcome when the two nodes have already achieved high-degree of synchronization precision.

An AOA measurement setup using MIMO Transceiver with Switching Antennas is also possible. It is possible to use a MIMO transceiver with more than one receiver connected to antenna switches. Similar to the previous case, as long as receivers share a common clock reference, it is straightforward to use the initial phase offset calculations to determine the angle of arrival from the target transmitter. In case receivers are not synchronized, frequency offset observed at different receivers can be used to calibrate out the initial phase offset measurements done at each receiver.

Figure 8:
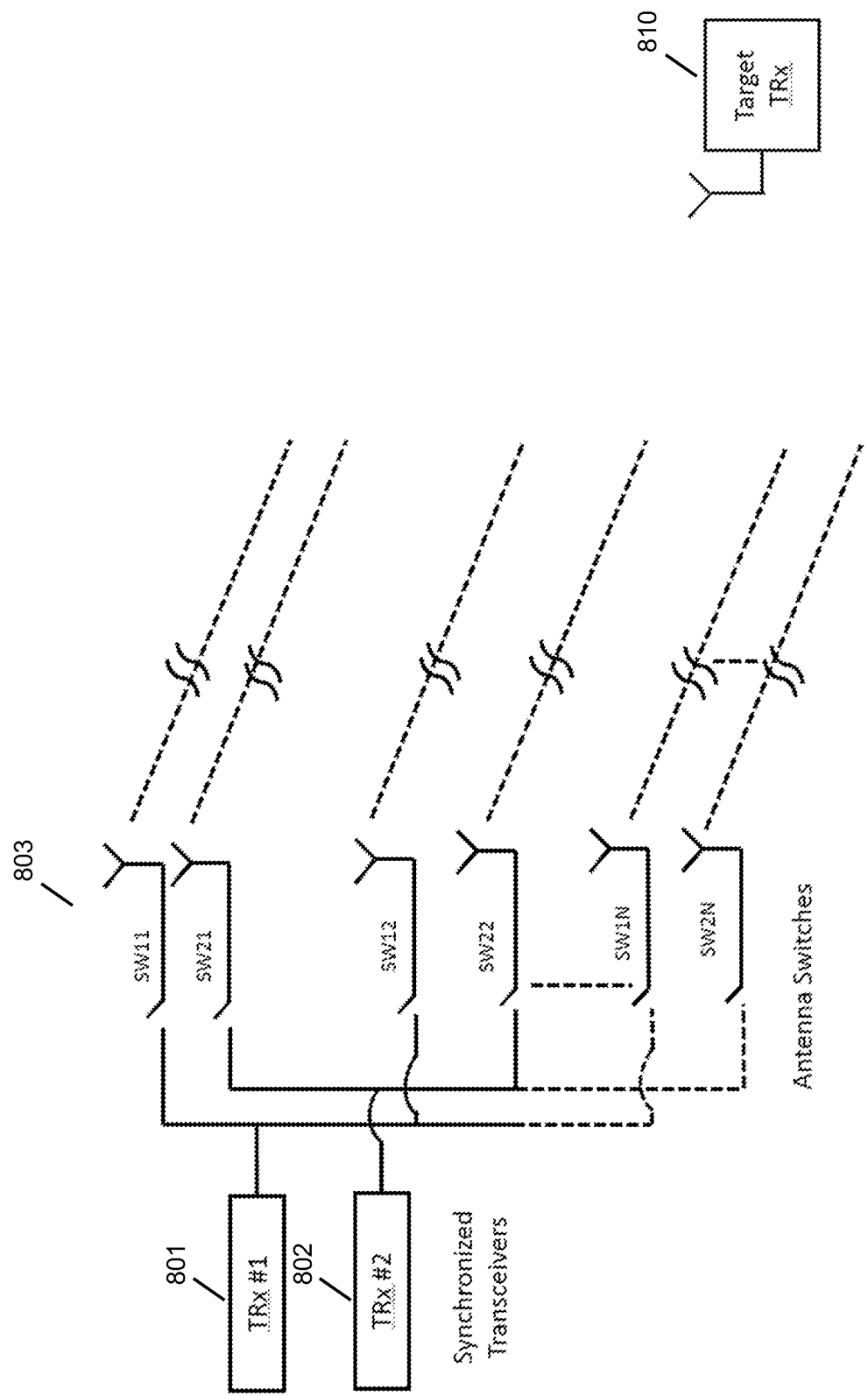
FIG. 8 is a schematic diagram of an example setup with 2 synchronized receivers connected to N antennas used to determine the angle of arrival, in accordance with some embodiments.

FIG. 8 shows an example MIMO setup with 2 synchronized receivers connected to N antennas used to determine the angle of arrival. Synchronized transceivers 801, 802 are coupled via switches 803 to antennas receiving signals from target TRX 810.

An AOA Measurement Setup using multiple SISO or MIMO Transceiver with Switching Antennas in Different Locations is also provided. Setups in FIG. 6 and FIG. 8 can be extended to include SISO or MIMO transceivers in different physical locations to determine initial phase offset and hence the angle of arrival at a disperse geometry in 2-D or 3-D to accurately position the target transmitter.

AOA may also be used as part of Positioning Applications.

Positioning Method Utilizing the Angle of Arrival Measurements Exclusively

One example of calculating positioning with any of the setups explained previously is shown in FIG. 9. A SISO transceiver connected to a switching antenna array performing sequential angle of arrival calculations or MIMO receivers performing simultaneous angle of arrival calculations may allow to calculate the target's position.

Figure 9:
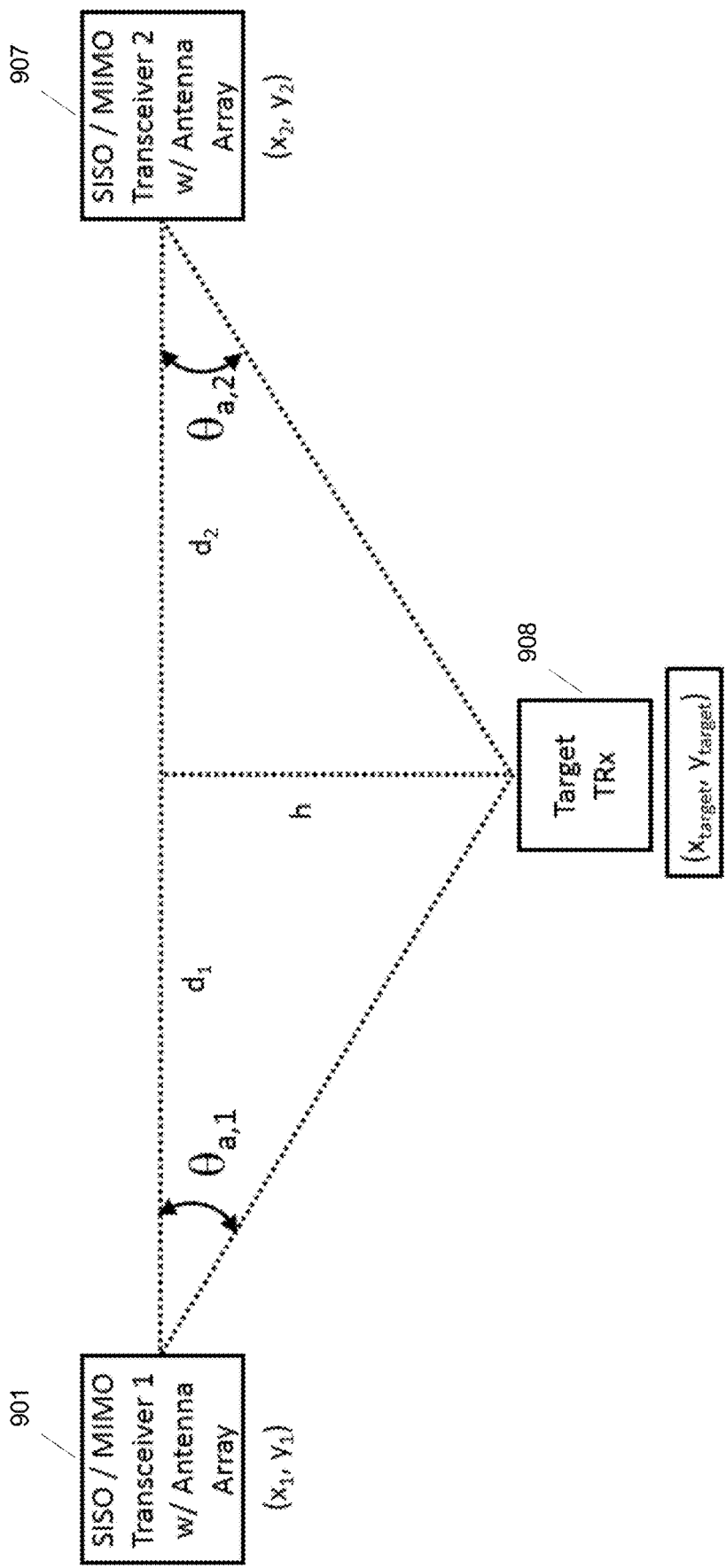
FIG. 9 is a schematic diagram of nodes for calculating positioning, in accordance with some embodiments.

FIG. 9. Network based positioning with SISO or MIMO transceivers performing only angle of arrival measurements. Node 901 is a SISO/MIMO transceiver with antenna array. Node 907 is a second SISO/MIMO transceiver with antenna array. Node 908 is the target TRX, with location $x_{target}$, $y_{target}$.

By using exclusively the accurate angle of arrival measurements with our RF Carrier Synchronization and Phase Alignment Methods outlined in Appendix A and B, target location can be calculated by a minimum of two (2) AOA measurements done at two base stations with known locations:

$$d_2 = \frac{d}{1 + \frac{\tan\theta_{a,2}}{\tan\theta_{a,1}}} \text{ and } h = d_2 * \tan\theta_{a,2} \quad (2)$$

where $d=d_1+d_2$ is the known distance between any 2 base stations making angle of arrival measurements. Then, $(x_{target}, y_{target})$ simply is $$x_{target}=x_2-d_2 \text{ and } y_{target}=y_2-h \qquad (3)$$

Above example is illustrated in 2-D space. However, the same principle applies in 3-D space as well. Assuming each node was able to project the angle of arrival (AOA) vector in 3-D, it takes only two nodes at minimum in order to identify the exact location of the target in 3-D space. Of course, we can further improve the accuracy of the target position when we deploy more monitoring nodes, which enables us to minimize estimation error through linear regression techniques such as least square algorithms or other regression algorithms.

A positioning Technique Using Angle of Arrival Combined with Delay Measurements is described.

AOA measurement from a single node can identify the target on the path of a particular vector in 3D space. Therefore, the monitoring node can identify the exact location of the target if the distance between the two nodes (the sensing node and the target node) are known. One approach is to measure the propagation delay of the transmitted signal from one node to the other. If this delay represents the path delay along the line of sight, we can identify the particular location of the target on the vector line created by the AOA measurement.

There are several well-understood delay measurement techniques. For example, Round Trip Time Measurement (RTTM) technique is one possible time-domain method. There are also frequency-domain approaches to calculating delay between the nodes, which is referred to as a "Super Resolution Technique."

Figure 10:
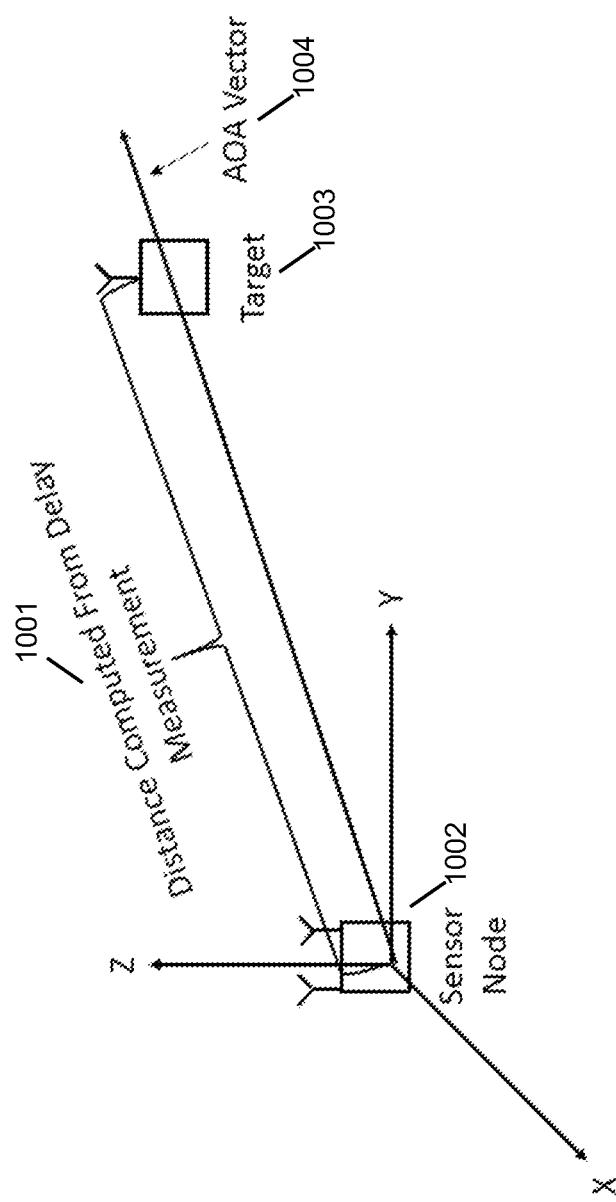
FIG. 10 is a schematic diagram of target tracking as referenced to a single monitoring node, in accordance with some embodiments.

FIG. 10 shows AOA and time delay based positioning. Sensor node 1002 is able to measure distance 1001 to target 1003 using AOA vector 1004. Combination of AOA measurement method and delay measurement method creates an efficient positioning system that is also well suited as a mobile positioning system as this method alleviates the need to maintain network with a known frame of reference. As the reference node can be reduced to a single node, the target can be tracked simply as referenced to the single monitoring node, which can easily be a mobile unit as illustrated in FIG. 10.

A positioning Generalization to Mesh Networks in three dimensions is described.

Above scenarios can be generalized to any mesh network of transceivers in 3 dimensions such as flying drones in formation or self-driving fleet of vehicles. As the number of unknowns in positioning calculations increase, more nodes are required to perform measurements to solve for these additional unknowns such as the height in 3-dimension. Angle of arrival measurements exclusively or angle of arrival in conjunction with delay measurements, Doppler measurements, time of arrival measurements can be used to complement or enhance the accuracy of positioning calculations.

Figure 11:
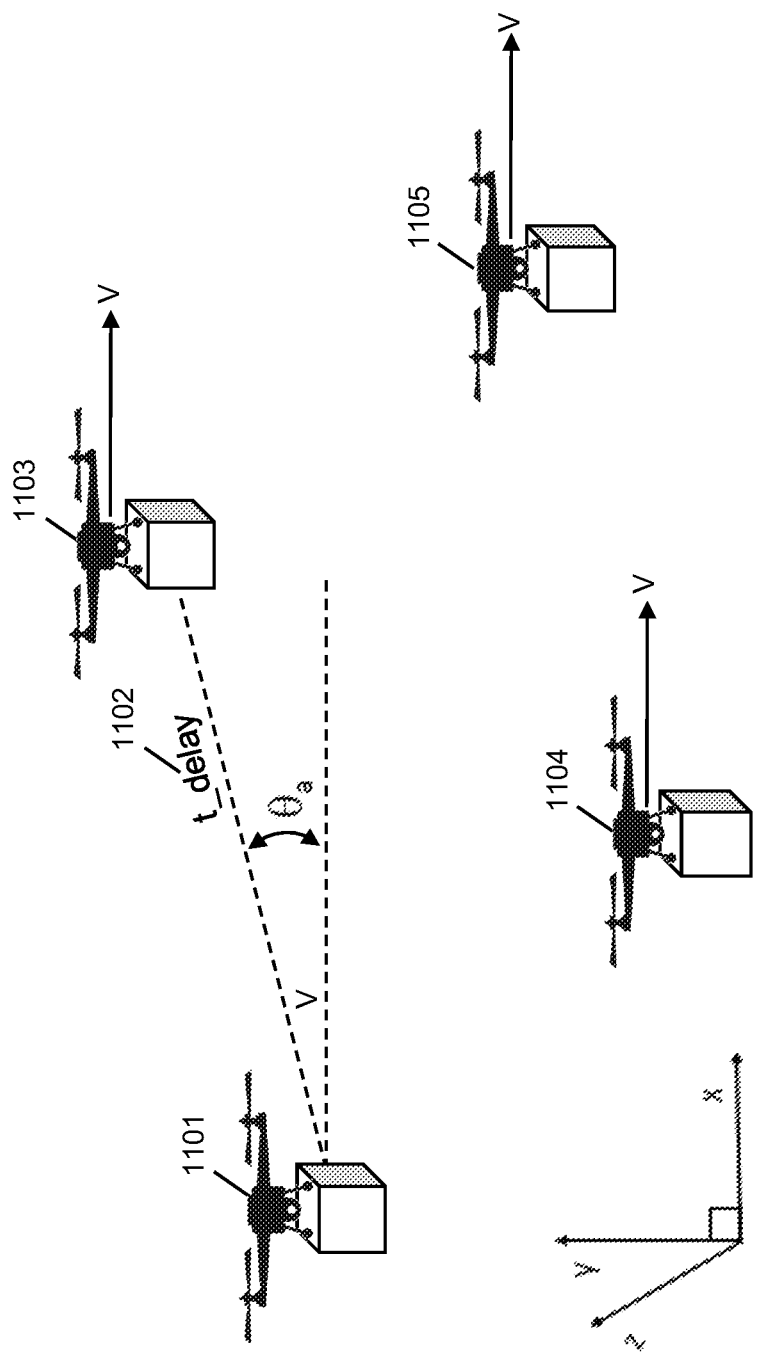
FIG. 11 is a schematic diagram of a fleet of drones moving in formation, in accordance with some embodiments.

FIG. 11. Mesh network positioning in 3 dimension with angle of arrival measurements. A fleet of drones 1101, 1104, 1103, 1105 moving in formation is shown in FIG. 11 as an example of using angle of arrival measurements by each drone to identify each other's position. Calculations required to maintain accurate and desired formation of the fleet can be done in a distributed manner or by a centralized processor. t_delay 1102 is used to calculate AOA.

Figure 12:
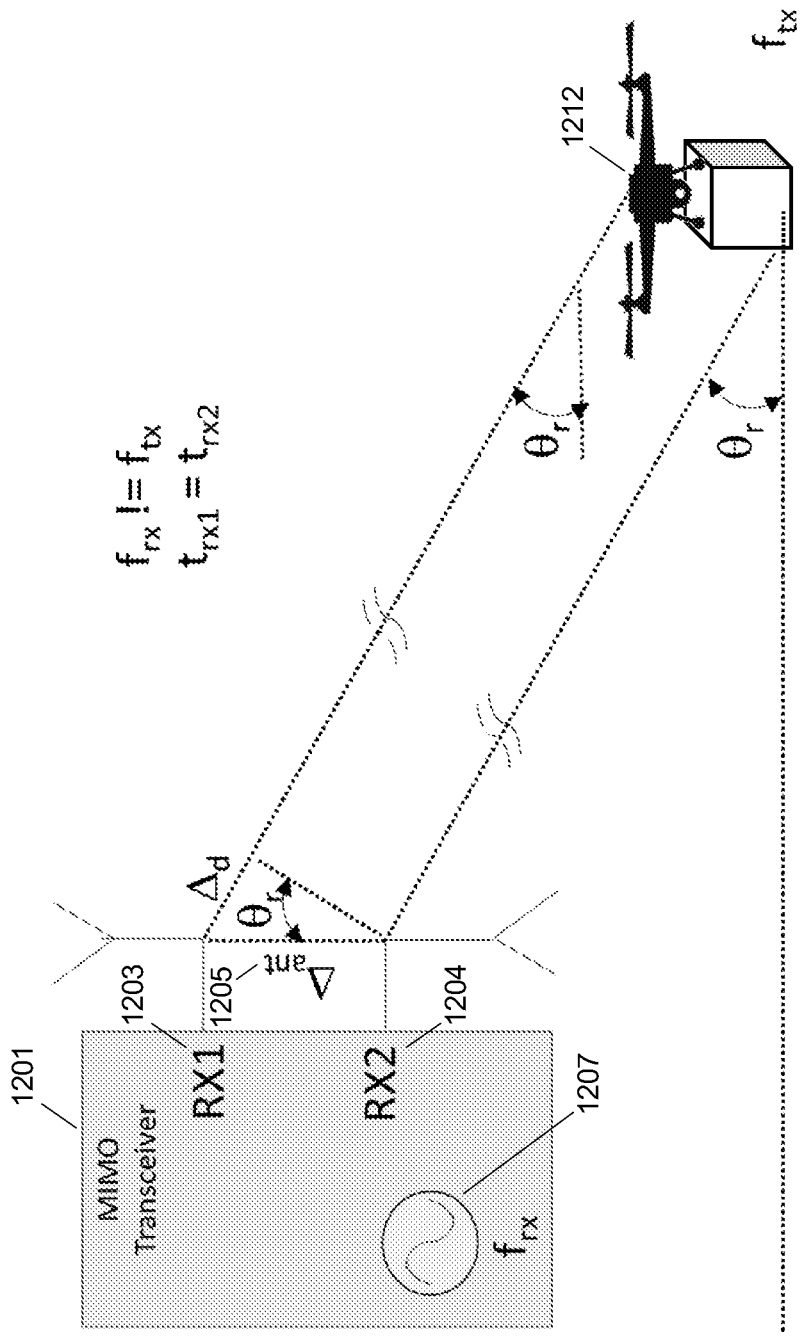
FIG. 12 is a schematic diagram of a system for AOA measurement with two receivers, in accordance with the prior art.

FIG. 12 shows such an implementation with 2 receivers with antenna separation of $\Delta ant$. $\Delta ant$ can be chosen to enable finer resolution at the expense of smaller range of angles measured. Time (or phase) of arrival measurement resolution of a given receiver is fixed by the transceiver hardware. A larger $\Delta ant$ will correspond to a narrower target range of angles by dividing the time resolution over a smaller range of angles. In other words, angle of arrival measurements will be valid over a narrower beam of angles, but with each angle measurement will be higher resolution.

The present disclosure takes advantage of our referenced RF Carrier Synchronization and Phase Alignment Methods. Our referenced highly accurate Frequency Offset (fos) measurements uses the statistical nature of random quadrature modulated signals to accurately measure frequency shift in the received carrier signals. Then, these offset measurements are used to train the reference clocks to the transceivers to achieve phase alignment between multiple transceivers.

A frequency synchronized and phase aligned network of transceivers open up different possibilities such as sequentially processing the incoming signals at 2 or more antennas for angle of arrival measurement with a single RF receiver as opposed to the traditional angle of arrival measurement which requires simultaneous processing with as many receivers as the number of antennas used.

With no frequency and phase synchronization between 2 transceivers, angle of arrival measurement will traditionally require 2 or more receivers since the time difference of arrival measurement can only be done for simultaneously received signals. This requirement can be explained by the additional phase rotation of signals due to the frequency offset between the transmitter and the receiver, if 2 measurements were taken at different times. For example, with frequency offset of $f_{os}$, 1st measurement done at $t=t_1$ and 2nd measurement done at $t=t_2$ will have a phase offset of $f_{os}*(t_2-t_1)$. With $f_{os}$ unknown, phase offset due to $f_{os}$ will be random and $\Delta_d$ shown in cannot be resolved to calculate the angle of arrival. With simultaneous measurements at 2 or more receivers, $f_{os}$ is still unknown, however $(t_2-t_1)$ is now zero, so no additional phase offset due to frequency offset is included in the time difference of arrival measurements.

FIG. 12. Traditional Angle of Arrival Measurement with a minimum of 2 Receivers. Traditional angle of arrival method does not require frequency and phase synchronization at the expense of additional, more complicated hardware. As shown, MIMO transceiver 1201 receives signals using two receivers 1203, 1204. It has its own oscillator 1207, which is not synchronized to target 1212.

Figure 13:
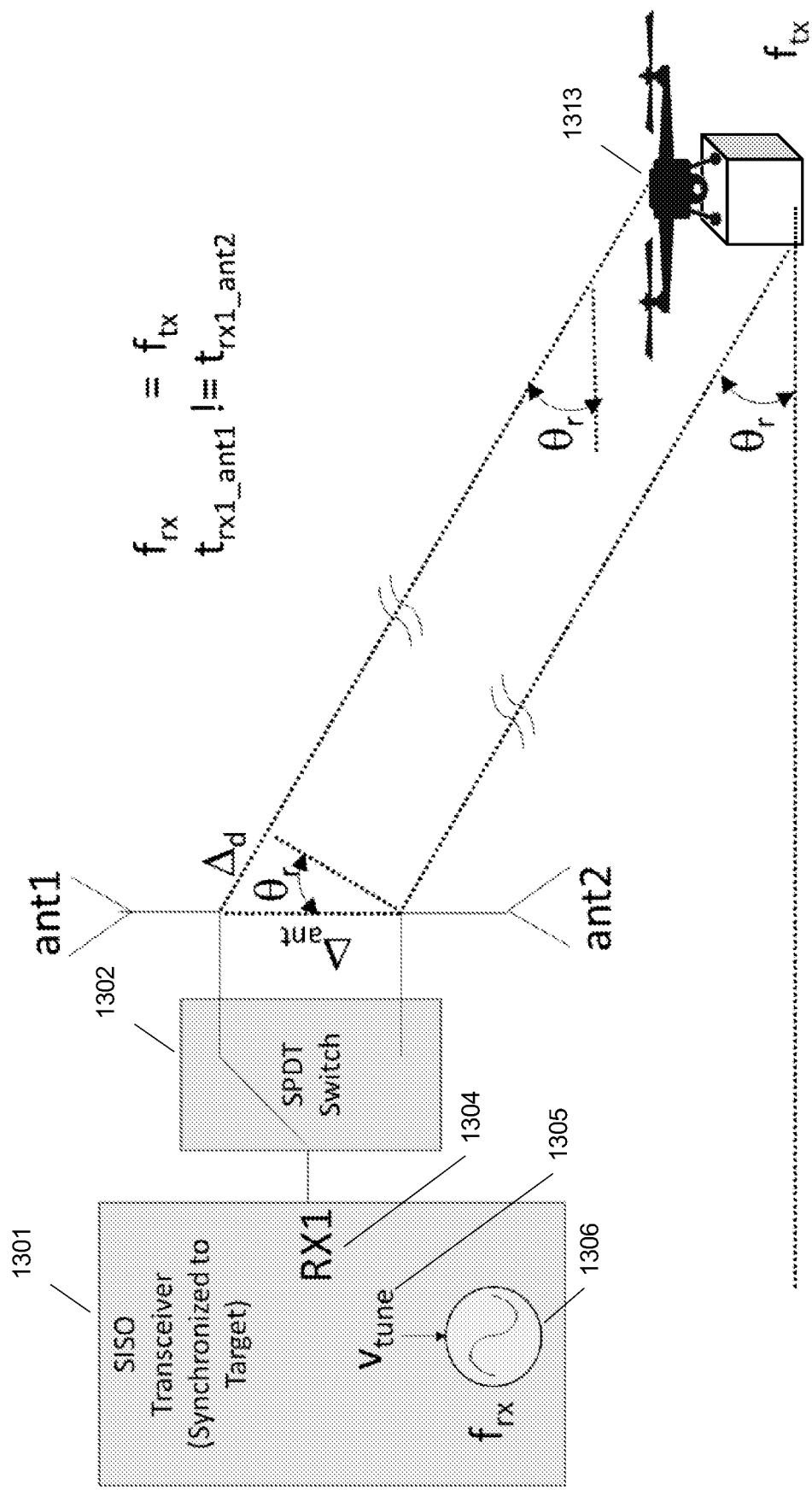
FIG. 13 is a schematic diagram of a system for AOA measurement with a single in, single out (SISO) transceiver in sync with its target, in accordance with some embodiments.

Disclosed systems and methods described in this document, allowing a minimum of one receiver to be used for angle of arrival measurements, employs our referenced RF Carrier Synchronization and Phase Alignment Methods [1]. With this method, frequency offset and initial phase of the incoming signal can be accurately measured. Measured frequency offset and initial phase can be used to either a) synchronize the receiver to the target transmitter's frequency source, or b) compensate the phase or time of the transmitter without having to synchronize to each target. A single receiver can do sequential measurements from each antenna and use those measurements to calculate angle of arrival for both the frequency synchronized and un-synchronized systems:

FIG. 13. Angle of Arrival with a SISO Transceiver (Synchronized to Target) Performing Measurements Sequentially. SISO transceiver 1301 is synchronized to its target, as shown by vtune 1305, which is feeding into oscillator 1306, such that only one RX 1304 and one SPDT switch 1302 is needed to track target 1313.

Once the receiver and transmitter are frequency and phase synchronized as shown in FIG. 13, the difference of phase measurements done at 2 different times, such as from antenna 1 at t=t1 and from antenna 2 at t=t2, will correspond directly to Δd as a function of the wavelength as shown in (Eq 1). Angle of arrival θ_r can then be easily calculated (Eq 2).

$$\Delta_d = \Delta_{ant} * \sin\theta_r = \frac{\lambda}{2\pi} * (\emptyset_{t_2} - \emptyset_{t_1}) \quad \text{(Eq 1)}$$

$$\theta_r = \arcsin\left(\frac{\lambda}{2\pi\Delta_{ant}} * (\emptyset_{t_2} - \emptyset_{t_1})\right) \quad \text{(Eq 2)}$$

where $(\emptyset_{t_2} - \emptyset_{t_1})$ is the phase difference between 2 measurements taken from the antenna 1 at t=t1 and from the antenna 2 at t=t2. In traditional methods, antenna 1 and 2 phase measurements would be performed simultaneously at time t=t1. Otherwise, angle of arrival calculation would be the same as shown in (Eq 1 and 2).

Figure 14:
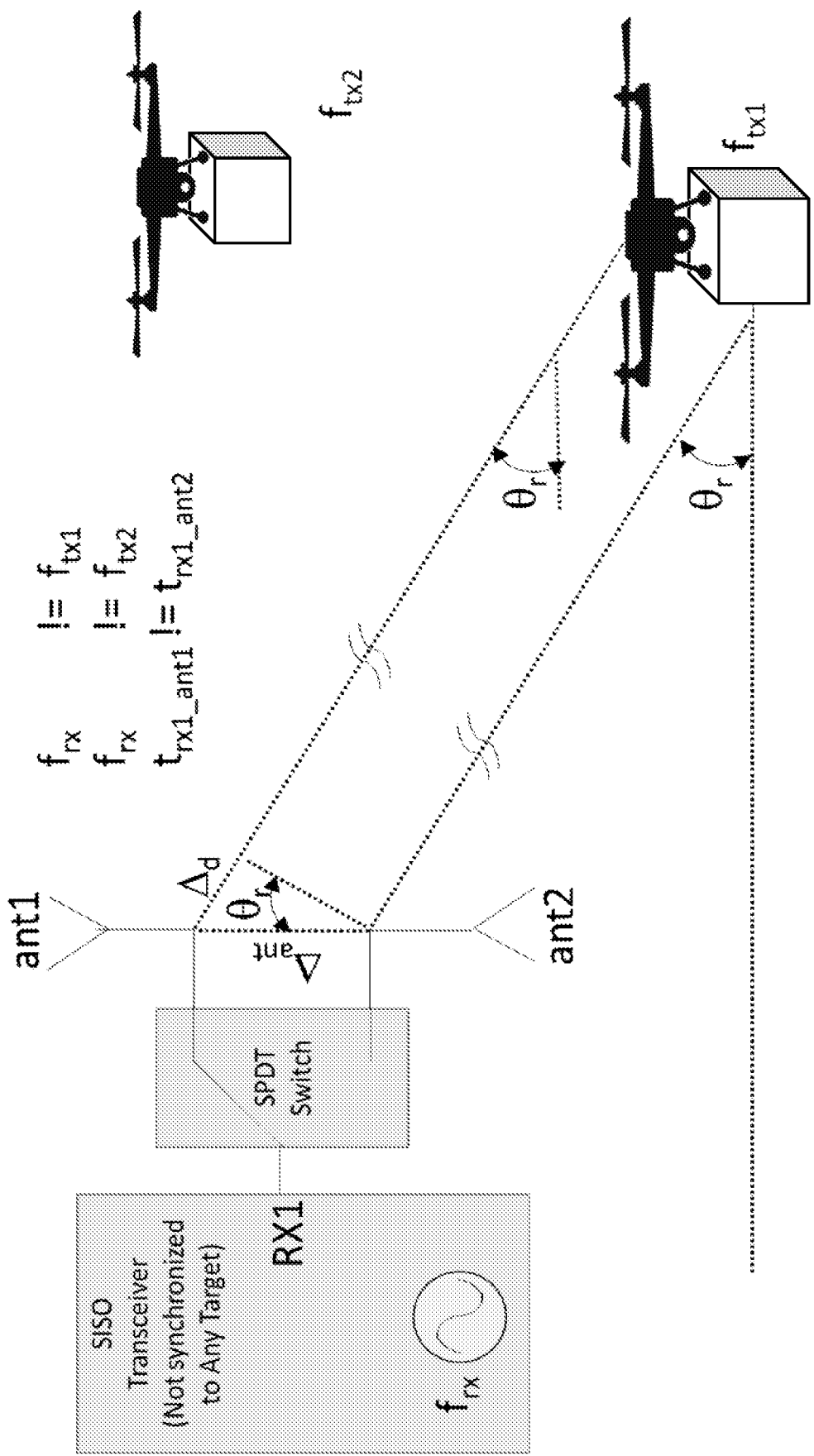
FIG. 14 is a schematic diagram of a system for AOA measurement with a SISO transceiver, in accordance with some embodiments.

FIG. 14. Angle of Arrival Tracking of Multiple Targets with a SISO Transceiver (Not Synchronized to Any Target) Performing Measurements Sequentially.

When angle of arrival system with a single receiver is tracking multiple targets as shown in FIG. 14, receiver can be used to measure each target's frequency offset and initial phase with great accuracy using our referenced RF Carrier Synchronization and Phase Alignment Methods [1]. Since receiver cannot synchronize to each target, each target's offset measurement is then used to compensate (remove) the phase offset between sequential measurements obtained from each antenna. Remaining phase (or time) offset will be only due to target's location, hence enabling an accurate angle of arrival measurement of each target.

An example of a single receiver tracking multiple targets is cellular applications such as LTE. It is not practical to assume each cellular user equipment, i.e. cell phones, can be synchronized due to a variety of brands and cost concerns. In some embodiments, the present disclosure takes advantage of the fact that LTE utilizes a frame structure, where all transmission and receiving is aligned to LTE frame boundaries. Each LTE frame is 10 ms long, and is further divided into 10 1 ms subframes. Each 1 ms subframe is also divided into 2 slots of 500 us long.

Each LTE base station and each LTE user equipment such as a phone is assigned to transmit at single or multiple slots of 500 us each.

In some embodiments, the known 500 us slot length may be used to supplement other calculations of the frequency offset and initial phase of each LTE user when they transmit at different slots. With measurements at different times (assigned LTE slots) and also at multiple antennas, each user's location can be determined by removing the frequency offset between the transmitter (user equipment) and receiver (base station with AOA capability based on our referenced RF Carrier Synchronization and Phase Alignment Methods [1].

Using a single receiver to measure angle of arrival can be accomplished with multiple antenna structures, with a few of the possible options shown next. Additional receivers can be optionally used to increase the speed of angle of arrival measurements by performing multiple phase or time of arrival measurements from multiple antennas. Otherwise, a single receiver, with the help of our referenced RF Carrier Synchronization and Phase Alignment Methods [1], is sufficient to perform all the antenna measurements sequentially, one at a time, to calculate the angle of arrival from a target.

Antenna Configurations for Single Receiver Angle of Arrival Measurements follow. Two layers of a circuit board are shown. Dots represent vias through the board to components below. Letters indicate couplings of vias.

There is no restriction on the type of antennas that can be used with the present disclosure. Most antenna examples will be depicted as microstrip patch antennas, however antennas such as dipoles, slot antennas, horn antennas and helical antennas can be used in the antenna array used for the angle of arrival measurements.

This disclosure allows the use of sequential (or serial) phase (or time) measurements to calculate the angle of arrival, hence reducing the transceiver hardware cost, complexity and other factors such as power consumption.

Circularly Polarized Antennas for Multi-Path Mitigation. Circularly polarized antennas can be used to receive both x-z and y-z linearly polarizations. FIG. 4 shows a simple example with corner truncated patch antennas to achieve circular polarizations. A single pole, four throw (SP4T) switch allows for each antenna phase measurement to be done sequentially to calculate the phase difference, which is then used to calculate angle of arrival in either x-z plane (between antennas A1 and A3 or between A2 and A4) or y-z plane (between antennas A1 and A2 or between A3 and A4).

Figure 15:
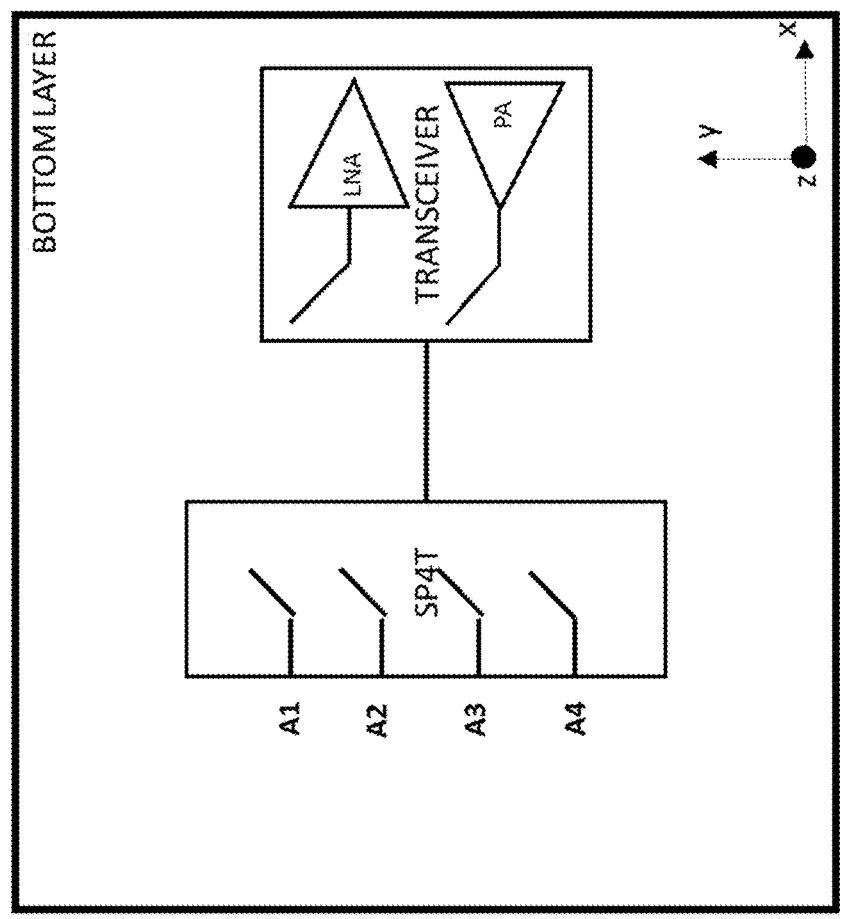
FIG. 15 is a schematic diagram of an antenna configuration for AOA measurement with circularly polarized antennas, in accordance with some embodiments.
Figure 15:
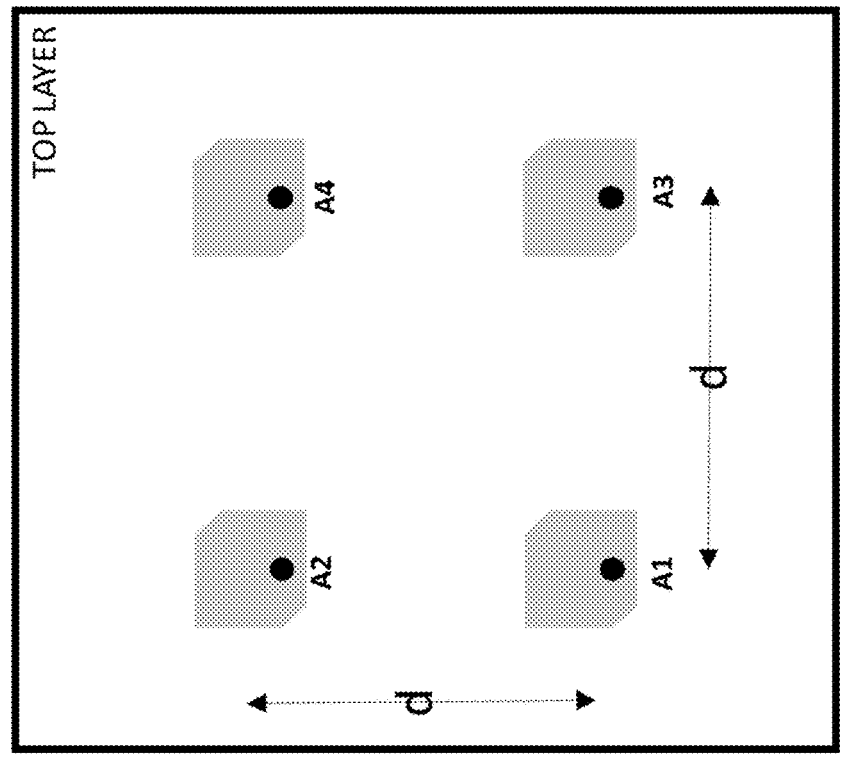

FIG. 15. Angle of arrival measurement with circularly polarized antennas.

Higher directivity (or gain) circularly polarized antennas can be used to increase the range of operation by focusing on a narrower range of angles.

In general, higher gain antennas may allow better immunity to multi-path by receiving signals from a narrow beam. In addition, circularly polarized antennas have the advantage of better immunity to multi-path since reflection from a surface will transform one polarization to the opposite. For example, a RHCP (right hand circularly polarized) antenna will reject most (due to imperfections in originating polarization) of the reflected waves which will transform to the opposite polarization LHCP (left hand circularly polarized).

Figure 16:
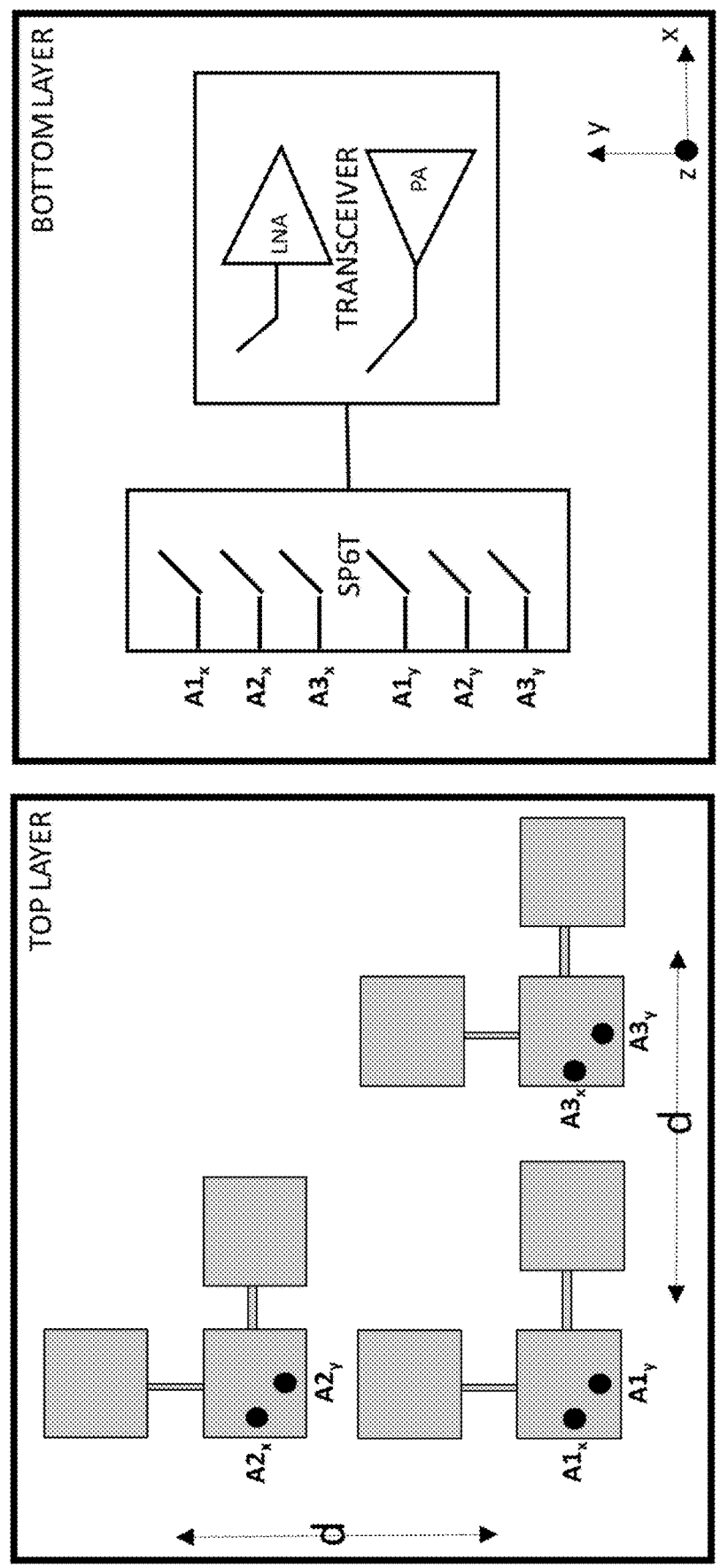
FIG. 16 is a schematic diagram of an antenna configuration for AOA measurement with serial patch antennas with x and y polarization, in accordance with some embodiments.

FIG. 16. Angle of arrival with single receiver using serial patch antennas with x and y polarization FIG. 16 shows an antenna configuration with serially connected patch antennas. Serial Patch Antennas with x and y Linear Polarization is shown.

Serial connection allows increased directivity, in other words higher antenna gain, with a simpler structure than a microstrip power combiner on the outward facing side of the antenna.

Antenna feed can be simply achieved by a via as shown as black dots, such as A2x and A2y on FIG. 5.

For each polarization, 2 serially connected patches exist, such as 2 horizontal patches fed by A2x will be sensitive to x-z polarized received signals.

Antenna separation d can be chosen to increase angle of arrival resolution at the expense of range of angles that can be measured.

Overall angle of arrival in 3 dimensions can be determined by calculating 2 orthogonal angle of arrival measurements in x-z and y-z planes. Each angle of arrival calculation will require 2 measurements for a total of 4:

x-z plane Measurement #1: Use switch (SP6T, single pole 6 throw switch) to select A1x feed at t=t1.

x-z plane Measurement #2: Use switch (SP6T, single pole 6 throw switch) to select A3x feed at t=t2.

y-z plane Measurement #3: Use switch (SP6T, single pole 6 throw switch) to select A1y feed at t=t3.

y-z plane Measurement #4: Use switch (SP6T, single pole 6 throw switch) to select A2y feed at t=t4.

Phase difference between Measurement #1 and #2 will correspond to angle of arrival in x-z plane. For example, if transmitter is placed directly across the receiver antennas between A1x and A3x, phase difference will be zero, meaning angle of arrival will be 0.

Similarly phase difference between A1y and A2y will correspond to angle of arrival in y-z plane.

By using these 2 angle of arrivals in x-z and y-z planes, transmitter's angle in 3 dimensions can be calculated.

Another possible set of 4 measurements compare 2 x-z polarized antenna measurements for y-z angle of arrival calculation and 2 y-z polarized antenna measurements for x-z angle of arrival:

y-z plane angle of arrival Measurement #1: Use switch (SP6T, single pole 6 throw switch) to select A1x feed at t=t1.

y-z plane Measurement #2: Use switch (SP6T, single pole 6 throw switch) to select A2x feed at t=t2.

x-z plane Measurement #3: Use switch (SP6T, single pole 6 throw switch) to select A1y feed at t=t3.

x-z plane Measurement #4: Use switch (SP6T, single pole 6 throw switch) to select A3y feed at t=t4.

Phase difference between Measurement #1 and #2 will correspond to angle of arrival in x-z plane. For example, if transmitter is placed directly across the receiver antennas between A1x and A3x, phase difference will be zero, meaning angle of arrival will be 0.

Similarly phase difference between A1y and A2y will correspond to angle of arrival in y-z plane.

By using these 2 angle of arrivals in x-z and y-z planes, transmitter's angle in 3 dimensions can be calculated.

Once again, using sequential measurements with a single receiver, instead of simultaneous measurements done with multiple receivers, is only made possible by utilizing our patented RF Carrier Synchronization and Phase Alignment Methods [1]. This is not possible with conventional angle of arrival measurement setups because of the unknown phase offsets at different time points.

Figure 17:
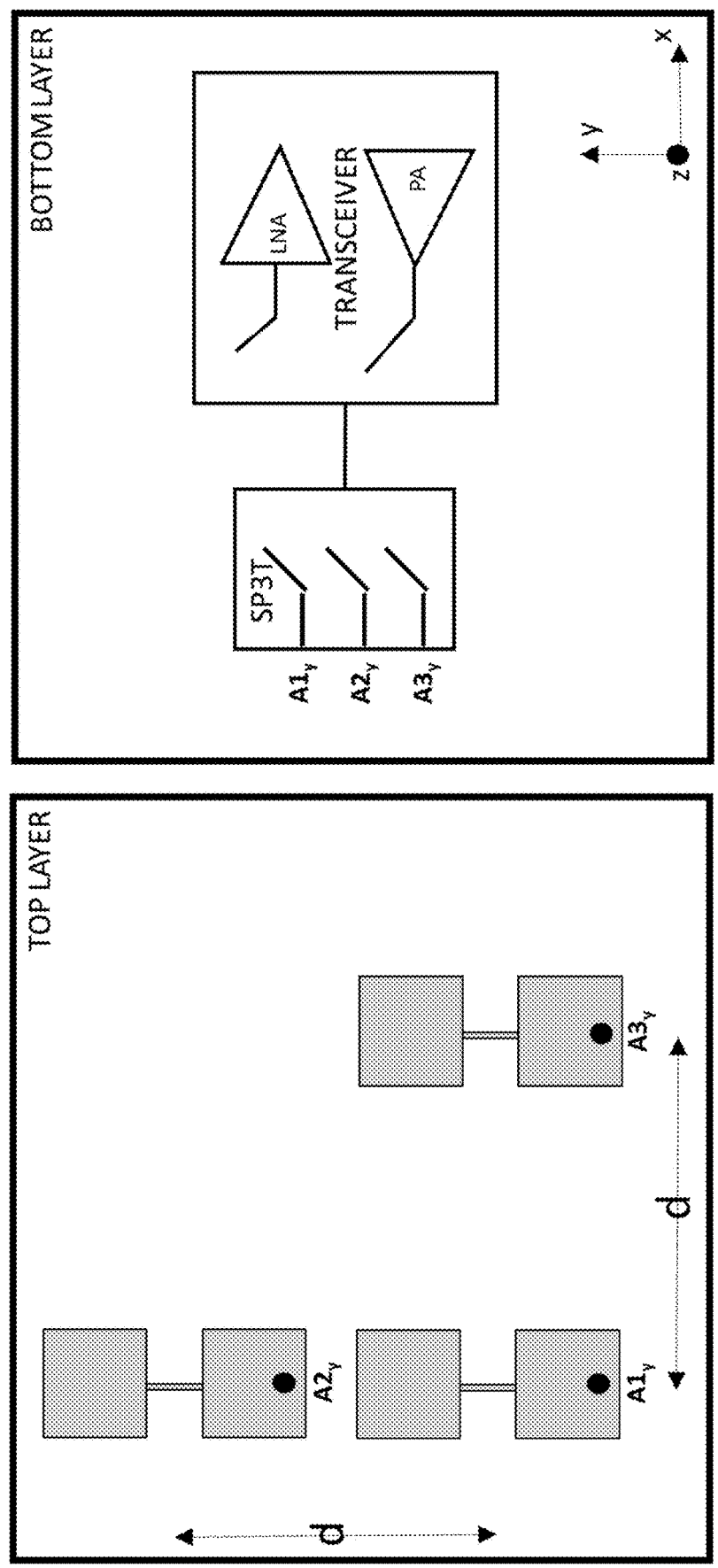
FIG. 17 is a schematic diagram of an antenna configuration for AOA measurement with a single receiver using serial patch antennas with y polarization, in accordance with some embodiments.

FIG. 17. Angle of arrival with single receiver using serial patch antennas with y polarization. This is a Linearly polarized antenna configuration.

The antenna configuration shown in FIG. 17 can be used to measure angle of arrival sensitive to y-z polarization. Some of the advantages are: This antenna is smaller than the configuration shown in FIG. 16. It uses a SP3T switch which is more common and cheaper than SP6T switches. Antenna can be rotated mechanically, and angle of arrival measurements for different polarizations can be calculated.

Compact Antennas with Power Combiners for Angle of Arrival with Multiple Receivers are also enabled.

This disclosure also allows the use of multiple receivers to speed up the angle of arrival calculations.

Figure 18:
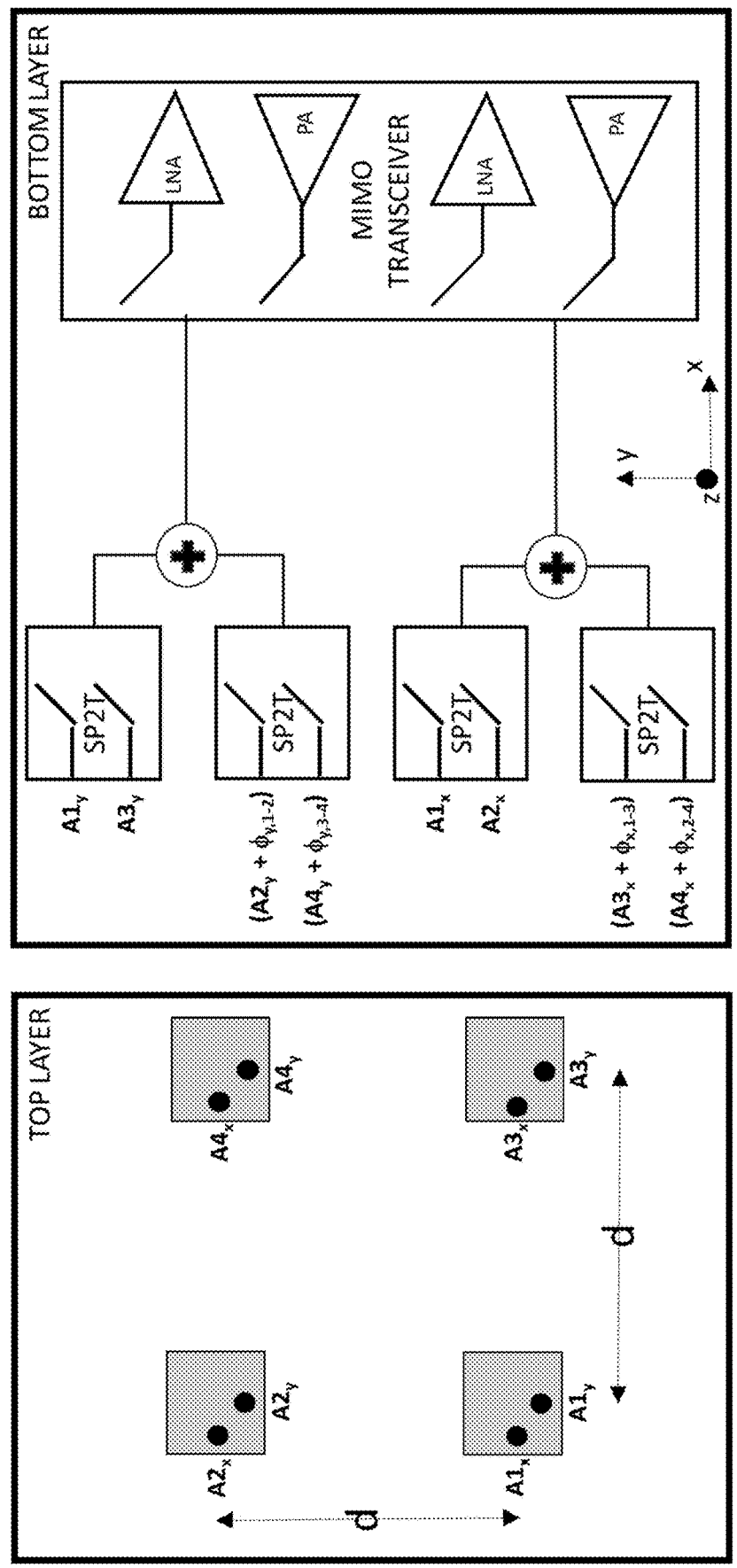
FIG. 18 is a schematic diagram of an antenna configuration for AOA measurement with multiple receivers and with multiple polarization and gain options, in accordance with some embodiments.

FIG. 18. Angle of arrival with multiple receivers (2 shown) with multiple polarization and gain options.

FIG. 18 shows a compact antenna configuration that utilizes 2 receivers. This has the following advantages:

Higher directivity (which typically translates to higher antenna gain) is achieved via power combiners, shown as + signs after the SP2T (single pole double throw) switches.

Signals received at the antennas are added in phase by adding phase shifts such as Φy, 1, 2 between A1y and A2y.

At t=t1, 2 simultaneous measurements at 2 receivers are done: A1y+(A2y+Φy, 1, 2) for y-z polarization measurement #1, and A1x+(A3x+Φx, 1, 3) for x-z polarization measurement #1.

At t=t2, 2 simultaneous measurements are done: A3y+(A4y+Φy, 3, 4) for y-z polarization measurement #2, and A2x+(A4x+Φx, 2, 4) for x-z polarization measurement #2.

Then, total of 4 measurements done at t=t1 and t=t2 can be used to calculate the angle of arrival.

Figure 19:
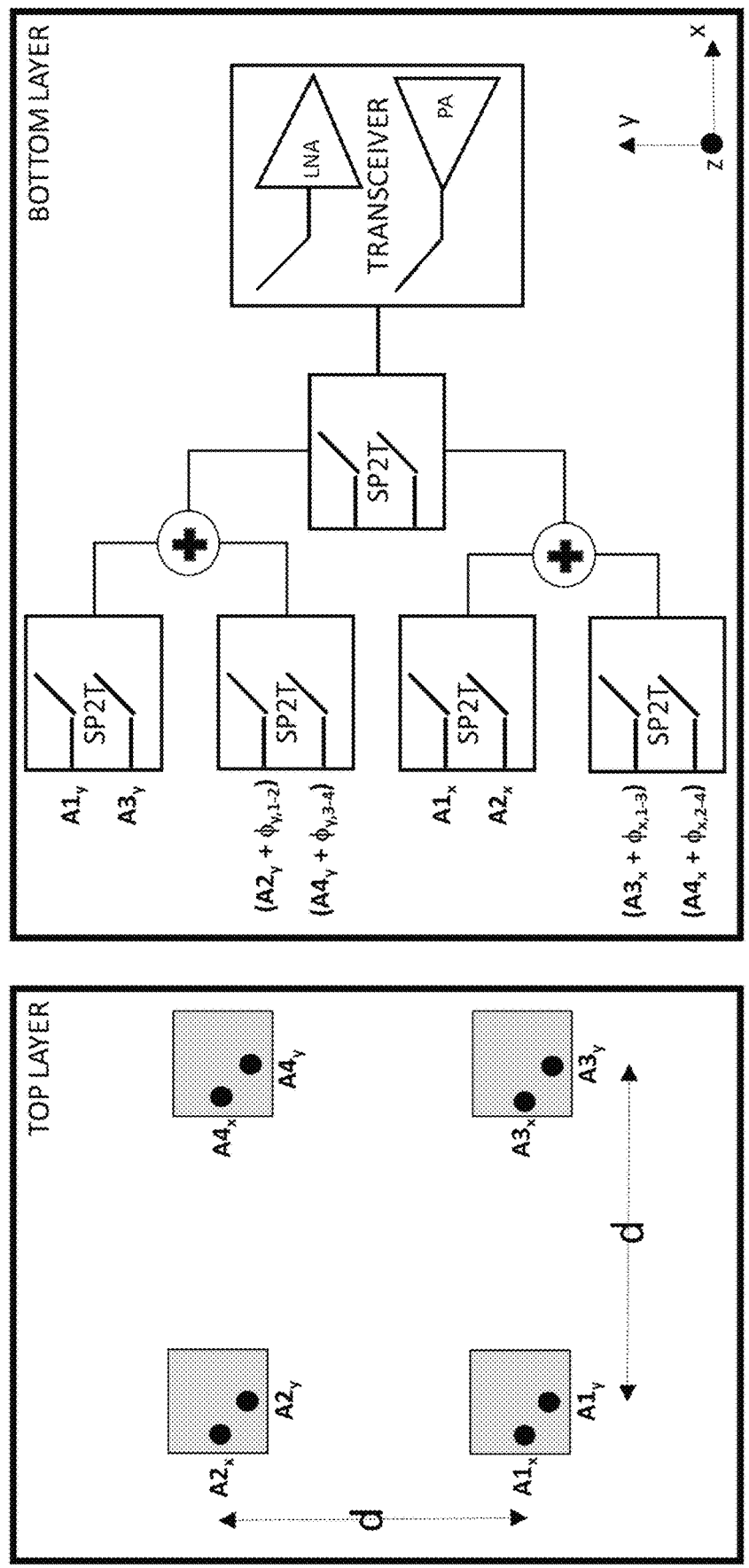
FIG. 19 is a schematic diagram of an antenna configuration for AOA measurement with a single receiver and with multiple polarization and gain options, in accordance with some embodiments.

FIG. 19. Angle of arrival with a single receiver with multiple polarization and gain options 3.1.5. Compact Antennas with Power Combiners for Angle of Arrival with a Single Receiver Antenna configuration shown in FIG. 18 can be converted to be used with a single receiver by adding another SP2T switch between the transceiver and the power combiners. New configuration is shown in FIG. 19. All measurements are done sequentially by using one receiver and since the transmitter and receiver are synchronized in frequency and phase, these sequential measurements can be used to calculate angle of arrival by comparing the phase of incoming signals.

From the foregoing, it will be clear that the present invention has been shown and described with reference to certain embodiments that merely exemplify the broader invention revealed herein. Certainly, those skilled in the art can conceive of alternative embodiments. For instance, those with the major features of the invention in mind could craft embodiments that incorporate one or major features while not incorporating all aspects of the foregoing exemplary embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for determining an angle of arrival of a received signal, comprising:
generating a baseband information signal by mixing a received signal with a local oscillator (LO) signal having an LO frequency, the received signal being an in-phase signal and quadrature signal uncorrelated with each other and derived from different input data sets;
obtaining baseband signal samples of the baseband information signal having an in-phase signal sample and a quadrature signal sample;
determining a transmitter phase offset based on an estimated correlation between the in-phase signal samples and the quadrature signal samples;
performing a plurality of phase measurements using a plurality of antennas to obtain a plurality of phase measurements;
correcting the plurality of phase measurements based on the transmitter phase offset to produce a plurality of corrected phase measurement; and
calculating an angle of arrival of the received signal based on the difference between the plurality of corrected phase measurements,
further comprising subsequently performing a third phase measurement for the received signal using the first antenna for a second plane orthogonal to the first plane; subsequently performing a fourth phase measurement for the received signal using the second antenna in the second plane; and calculating an angle of arrival in the second plane based on the difference between the third and the fourth corrected phase measurements.

2. The method of claim 1, further comprising calculating an angle of arrival in three-dimensional space using the calculated angle of arrival in the first plane and the calculated angle of arrival in the second plane.

3. A method for determining an angle of arrival of a received signal, comprising:
determining a phase offset of a mobile transmitter relative to an oscillator in a radio frequency (RF) transceiver;
receiving a first signal from the mobile transmitter via a first antenna in the RF transceiver;
receiving a second signal from the mobile transmitter via the first antenna, the second signal being received after reception of the first signal;
comparing the first and the second signal to determine a delay;
subtracting the phase offset of the mobile transmitter from the delay to obtain a position-dependent delay component; and
determining an angle of arrival based on the position-dependent delay component.

4. An antenna configuration for a radio frequency (RF) transceiver, comprising:
a first antenna on a flat plane;
a second antenna on the flat plane at a first distance from the first antenna along a first axis;
a third antenna on the flat plane at a second distance from the first antenna along a second axis perpendicular to the first axis;
a fourth antenna on the flat plane at a first distance from the second antenna along the first axis and at the second distance from the third antenna along the second axis;
a single pole switch having a first throw connected to the first antenna, a second throw connected to the second antenna, a third throw connected to the third antenna, and a fourth throw connected to the fourth antenna; and
a radio transceiver coupled to an output of the single pole switch,
wherein the first, second, third, and fourth antennas are circularly polarized corner truncated patch antennas,
thereby enabling the RF transceiver to perform sequential phase or time measurements for calculating angle of arrival.

5. A radio frequency (RF) transceiver, comprising:
a plurality of patch antennas on a first circuit board plane;
a switching means on a second circuit board plane coupled to the plurality of patch antennas by vias;

a radio frequency (RF) transceiver coupled to the switching means; and a processor coupled to the RF transceiver, wherein the processor is configured to operate the switching means to select a particular coupling of the plurality of patch antennas to the RF transceiver, and to perform a sequential series of phase measurements using the particular coupling of the plurality of patch antennas, and to calculate an angle of arrival, and wherein the processor is configured to calculate the angle of arrival by measuring a first phase measurement for a received signal for a first plane, subsequently measuring a second phase measurement for the received signal for the first plane, correcting the second phase measurement based on the measured frequency offset and initial phase of the received signal to produce a second corrected phase measurement, and calculating the angle of arrival in the first plane based on the difference between the second corrected and first phase measurements.

6. The RF transceiver of claim 5, wherein the processor is configured to calculate the angle of arrival in a second plane orthogonal to the first plane based on a third phase measurement from a first antenna in the second plane and a fourth phase measurement from a second antenna in the second plane.

7. The RF transceiver of claim 5, wherein the processor is configured to calculate an angle of arrival in 3-dimensional space using the calculated angle of arrival in the first plane and the calculated angle of arrival in the second plane.

8. The RF transceiver of claim 5, wherein phase measurements are delay measurements.

9. The RF transceiver of claim 5, wherein the predicted phase measurement is based on a measured frequency offset and initial phase of the received signal.

10. The RF transceiver of claim 5, wherein the plurality of patch antennas comprises four circularly polarized corner truncated patch antennas, and wherein the switching means comprises a single pole four throw (SP4T) switch.

11. The RF transceiver of claim 5, wherein the plurality of patch antennas comprises higher gain or higher directivity antennas for increasing range of operation.

12. The RF transceiver of claim 5, wherein the plurality of patch antennas comprises two serially connected patch antennas for x-z polarized signals and two serially connected patch antennas for y-z polarized signals.

13. The RF transceiver of claim 5, wherein a first patch antenna and a second patch antenna are connected to the switching means via a first via, and the first patch antenna and a third patch antenna, perpendicularly oriented relative to the first and second patch antennas, are connected to the switching means via a second via.

14. The RF transceiver of claim 5, wherein the plurality of patch antennas comprises nine patch antennas, and wherein the switching means comprises a single pole six throw (SP6T) switch.

15. The RF transceiver of claim 5, wherein the plurality of patch antennas comprises six patch antennas, and wherein the switching means comprises a single pole three throw (SP3T) switch.

16. The RF transceiver of claim 5, wherein the plurality of patch antennas comprises four patch antennas, and wherein the switching means comprises two pairs of single pole two throw (SP2T) switches coupled to two power combiners.

17. The RF transceiver of claim 5, wherein the plurality of patch antennas comprises four patch antennas, and wherein the switching means comprises two pairs of single pole two throw (SP2T) switches coupled to two power combiners and the two power combiners coupled to a fifth single pole two throw (SP2T) switch.

* * * * *